(12) United States Patent
Agrawal et al.

(10) Patent No.: US 12,056,791 B2
(45) Date of Patent: Aug. 6, 2024

(54) GENERATING OBJECT-BASED LAYERS FOR DIGITAL IMAGE EDITING USING OBJECT CLASSIFICATION MACHINE LEARNING MODELS

(71) Applicant: Adobe Inc., San Jose, CA (US)

(72) Inventors: Harshit Agrawal, Navi Mumbai (IN); Venkatrayalu Krishnamurthy Logashwar, Bengaluru (IN)

(73) Assignee: Adobe Inc., San Jose, CA (US)

(*) Notice: Subject to any disclaimer, the term of this patent is extended or adjusted under 35 U.S.C. 154(b) by 421 days.

(21) Appl. No.: 17/407,863

(22) Filed: Aug. 20, 2021

(65) Prior Publication Data

US 2023/0059007 A1 Feb. 23, 2023

(51) Int. Cl.
| | |
|---|---|
| *G06T 11/00* | (2006.01) |
| *G06F 3/04845* | (2022.01) |
| *G06F 16/53* | (2019.01) |
| *G06F 18/24* | (2023.01) |
| *G06N 20/00* | (2019.01) |
| *G06V 20/80* | (2022.01) |

(52) U.S. Cl.
CPC .......... *G06T 11/00* (2013.01); *G06F 3/04845* (2013.01); *G06F 16/53* (2019.01); *G06F 18/24* (2023.01); *G06N 20/00* (2019.01); *G06V 20/80* (2022.01); *G06T 2200/24* (2013.01)

(58) Field of Classification Search
CPC ..... G06T 11/00; G06T 2200/24; G06T 11/60; G06F 3/04845; G06F 16/53; G06F 18/24; G06F 16/55; G06N 20/00; G06V 20/80; G06V 10/764; G06V 10/82; G06V 10/945; G06V 20/70

USPC .......................................................... 382/224
See application file for complete search history.

(56) References Cited

U.S. PATENT DOCUMENTS

| | | | | |
|---|---|---|---|---|
| 7,983,512 | B2* | 7/2011 | Gerhard ................. | G06T 11/20 382/305 |
| 8,024,343 | B2* | 9/2011 | Gallagher ............... | G06F 16/58 707/758 |
| 9,639,969 | B1* | 5/2017 | Wilson ................... | H04L 51/234 |
| 11,055,566 | B1* | 7/2021 | Pham ..................... | G06V 10/82 |
| 11,763,540 | B2* | 9/2023 | Yang ....................... | G06N 3/08 382/103 |
| 2014/0161314 | A1* | 6/2014 | Ostrovsky-Berman ..................... | G06F 16/951 707/706 |

(Continued)

*Primary Examiner* — Kathleen Y Dulaney

(74) *Attorney, Agent, or Firm* — Keller Preece PLLC

(57) ABSTRACT

The present disclosure relates to systems, methods, and non-transitory computer readable media for accurately, efficiently, and flexibly generating image layers and determining layer labels utilizing a machine learning approach. For example, the disclosed systems utilize an image segmentation machine learning model to segment the digital image and identify individual objects depicted within the digital image. Additionally, in some embodiments, the disclosed systems determine object classifications for the depicted objects by utilizing an object classification machine learning model. In some cases, the disclosed systems further generate image layers for the digital image by generating a separate layer for each identified object (or for groups of similar objects). In certain embodiments, the disclosed systems also determine layer labels for the image layers according to the object classifications of the respective objects depicted in each of the image layers.

20 Claims, 12 Drawing Sheets

(56) References Cited

U.S. PATENT DOCUMENTS

| | | | |
|---|---|---|---|
| 2016/0147721 A1* | 5/2016 | Gilra | G06F 40/166 |
| | | | 715/229 |
| 2018/0084119 A1* | 3/2018 | Yoshida | G11B 27/028 |
| 2018/0109776 A1* | 4/2018 | Lee | G06V 10/764 |
| 2018/0285535 A1* | 10/2018 | Zhu | G06N 20/00 |
| 2019/0163766 A1* | 5/2019 | Gulati | G06F 16/532 |
| 2019/0180486 A1* | 6/2019 | Wu | G06T 11/00 |
| 2019/0196698 A1* | 6/2019 | Cohen | G10L 15/22 |
| 2019/0260870 A1* | 8/2019 | Spivack | G06F 3/011 |
| 2019/0279345 A1* | 9/2019 | Kim | G06F 18/214 |
| 2019/0378204 A1* | 12/2019 | Ayush | G06Q 30/0643 |
| 2020/0145583 A1* | 5/2020 | Shanmugam | G06T 11/60 |
| 2020/0151448 A1* | 5/2020 | Lin | G06V 10/82 |
| 2020/0160042 A1* | 5/2020 | Bui | G06V 10/764 |
| 2020/0196015 A1* | 6/2020 | Pate | G06V 10/82 |
| 2020/0250453 A1* | 8/2020 | Gupta | G06F 3/0482 |
| 2020/0273090 A1* | 8/2020 | Ayush | G06T 7/75 |
| 2020/0302656 A1* | 9/2020 | Kumar | G06T 7/90 |
| 2021/0014413 A1* | 1/2021 | Yang | H04N 23/69 |
| 2021/0027083 A1* | 1/2021 | Cohen | G06V 20/70 |
| 2021/0027448 A1* | 1/2021 | Cohen | G06F 16/5838 |
| 2021/0104261 A1* | 4/2021 | Facer | G11B 27/031 |
| 2021/0142479 A1* | 5/2021 | Phogat | G06T 11/206 |
| 2021/0181930 A1* | 6/2021 | Gurule | G06F 16/9038 |
| 2021/0201077 A1* | 7/2021 | Lwowski | G06V 20/10 |
| 2021/0209339 A1* | 7/2021 | You | G06V 10/454 |
| 2021/0374408 A1* | 12/2021 | Kim | G06F 16/51 |
| 2021/0390673 A1* | 12/2021 | Ban | G06T 7/194 |
| 2022/0237799 A1* | 7/2022 | Price | G06T 3/4046 |
| 2022/0374543 A1* | 11/2022 | Chen | G06T 19/006 |
| 2023/0146134 A1* | 5/2023 | Selviah | G06V 20/653 |
| | | | 345/419 |

* cited by examiner

GENERATING OBJECT-BASED LAYERS FOR DIGITAL IMAGE EDITING USING OBJECT CLASSIFICATION MACHINE LEARNING MODELS

BACKGROUND

Existing hardware and software platforms provide systems and methods for generating and editing layers within digital images. For example, some existing digital image editing systems generate layers within digital images that are independently editable and that include different components of digital images. Despite these advances, however, many conventional digital image editing systems continue to demonstrate a number of deficiencies or drawbacks, particularly in accuracy, speed, and flexibility.

For example, many conventional digital image editing systems inaccurately generate and name image layers. To elaborate, existing systems often generate layers that correspond to different lines, colors, or features within a digital image and utilize default names or labels for these layers, such as "Layer 1" or "Layer 2." These generic descriptors inaccurately represent subject matter depicted within the layers. Not only are these generic labels not descriptive, but the conventional systems that generate these labels only rename layers based on express user input. Indeed, existing systems generally only rename layers in response to user interaction to rename the layers based on entered text input.

In addition to their inaccuracy, some conventional digital image editing systems are also inefficient. More specifically, existing systems often require extensive user interactions to generate image layers which hampers the speed with which these existing systems can generate the image layers. Many conventional systems are capable of generating image layers only in response to user interaction expressly defining the image layers in the first place. Indeed, existing systems require user interaction to deliberately generate new image layers and to indicate individual objects to include within respective layers. Processing these user interactions slows the process of generating image layers, especially as the number of layers grows large within a complex digital image (or image project that includes multiple images).

Further, many conventional digital image editing systems are inflexible. For example, conventional systems often rigidly fix image layers within individual image projects. Specifically, existing systems silo image layers within the projects wherein they are generated, unable to adaptively share layers across separate projects. Thus, for a given digital image editing project, a conventional system is restricted to accessing those image layers generated as part of that project.

Thus, there are several disadvantages with regard to conventional digital image editing systems.

SUMMARY

This disclosure describes one or more embodiments of systems, methods, and non-transitory computer readable media that solve one or more of the foregoing or other problems in the art with a machine learning approach for generating and labeling image layers within digital images according to object classifications of detected objects within the digital images. For example, the disclosed systems utilize an image segmentation machine learning model to segment the digital image and identify individual objects depicted within the digital image. Additionally, in some embodiments, the disclosed systems determine object classifications for the depicted objects by utilizing an object classification machine learning model. In some cases, the disclosed systems further generate image layers for the digital image by generating a separate layer for each identified object (or for groups of similar objects). In certain embodiments, the disclosed systems also determine layer labels for the image layers according to the object classifications of the respective objects depicted in each of the image layers. By utilizing the machine learning model approach to generate and label image layers as described herein, the disclosed systems can improve accuracy, efficiency, and flexibility of implementing computing devices. For example, the disclosed systems can utilize intelligently generated layers and layer labels to efficiently and accurately select objects, modify portions of digital images, generate digital file names, search for relevant layers or objects portrayed in digital images, and/or transfer layers across digital image projects.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
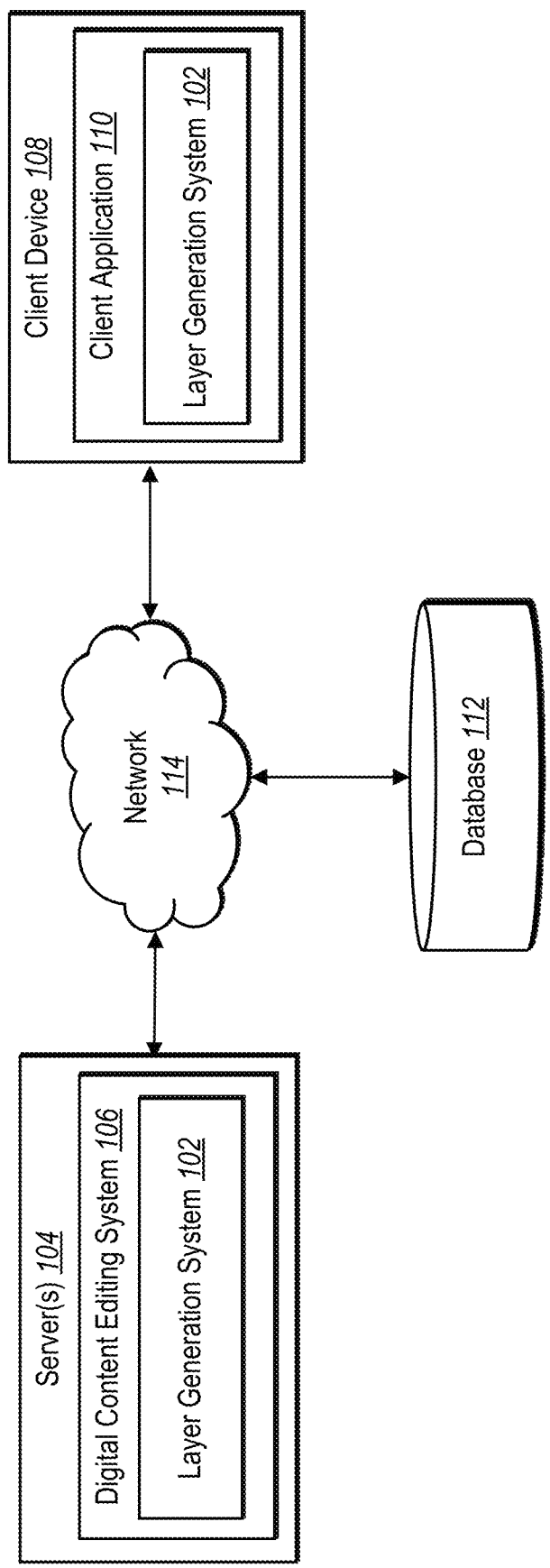
FIG. 1 illustrates an example system environment in which a layer generation system operates in accordance with one or more embodiments.

This disclosure describes one or more embodiments of a layer generation system that utilizes machine learning approaches to accurately, efficiently, and flexibly generate and label image layers within digital images according to object classifications of detected objects within the digital images. In particular, in some embodiments, the layer generation system automatically (e.g., without user input) generates image layers from a digital image depicting one or more objects. For example, the layer generation system detects objects within the digital image utilizing an image segmentation machine learning model and determines object classifications for the objects utilizing an object classification machine learning model. In some embodiments, the layer generation system further generates image layers for each of the detected objects and further determines layer labels for the image layers based on the object classifications. In certain cases, the layer generation system updates the image layers and the layer labels after edits or modifications to the digital image (e.g., in response to user interaction modifying one or more object-specific layers). In one or more embodiments, the layer generation system also enables layer searching and/or layer filtering to identify object-specific image layers (from within the same digital image project or from a separate digital image project). Indeed, in some cases, the layer generation system transfers or shares image layers across different digital images or digital image projects. In some implementations, the layer generation system also determines a name for the digital image (or a digital image project associated with the digital image) based on layer labels of image layers within the digital image.

As just mentioned, in one or more embodiments, the layer generation system generates object-specific image layers from a digital image. For example, the layer generation system generates object-specific image layers based on individual objects identified within a digital image and corresponding object classifications associated with the identified objects. In some cases, the layer generation system utilizes an image segmentation machine learning model to analyze pixels of a digital image to determine, identify, or detect objects depicted within the digital image. For instance, the layer generation system detects edges or other distinctions between objects and other pixels to determine sets of pixels representing the individual objects within the digital image.

In some embodiments, the layer generation system also determines object classifications for identified objects. For example, the layer generation system utilizes an object classification machine learning model to determine, predict, or generate object classifications for each of the objects detected within a digital image. In some cases, the layer generation system utilizes an object classification machine learning model that determines probabilities of depicted objects corresponding to various labels or classes, and assigns labels (e.g., "chair," "vase," "lamp," or "plant") according to the probabilities.

Based on detecting and classifying the objects depicted within a digital image, in some embodiments, the layer generation system further generates and labels image layers. For instance, in some implementations the layer generation system generates an image layer for each respective object identified within the digital image and determines the layer label based on the object classification of the respective object. In one or more implementations, the layer generation system groups one or more objects together in a single layer based on a common object classification shared among the objects. Regardless of the number or types of objects corresponding to each layer, the layer generation system can generate and labels object-specific image layers automatically, e.g., without user input selecting and/or labeling objects or layers within the digital image.

As further mentioned above, in some embodiments, the layer generation system updates image layers and layer labels based on edits or modifications. For example, the layer generation system receives an indication of a user interaction to edit or modify a digital image, such as resizing, moving, deleting, adding, or otherwise modifying all or a portion of an object depicted within the digital image (e.g., via user interaction with a selectable layer element). In response to the user interaction, in some cases, the layer generation system updates the image layers by re-applying the image segmentation machine learning model to re-detect sets of pixels depicting individual objects. In further response to the user interaction, in certain cases, the layer generation system also updates the layer labels by re-applying the object classification machine learning model to re-determine object labels for objects depicted within the digital image. By updating image layers and layer labels in this fashion, the layer generation system maintains and displays up-to-date layer information for a digital image after each edit (or, in some cases, after a threshold number of edits or based on a regular time interval).

In one or more implementations, the layer generation system searches and/or filters image layers. For instance, based on a filter query to filter through layers within a digital image, the layer generation system filters out image layers by name according to the layer labels generated based on object classifications. Additionally, in some embodiments, the layer generation system stores image layers within a database accessible across different digital image projects. Thus, in some embodiments, the layer generation system receives an indication of a user interaction within one digital image project to search for or otherwise access an image layer generated from another digital image project. In these or other embodiments, the layer generation system provides the image layer across the digital image projects based on a search query or other user interaction such as a click-and-drag from one digital image project to another.

In some embodiments, the layer generation system generates a name for a digital image or a digital image project based on one or more layer labels for layers within a digital image. To elaborate, in some cases, the layer generation system automatically (e.g., without user input to expressly enter a name) generates a name as a combination of, or extrapolation from, the layer labels associated with the layers of the digital image. For instance, the layer generation system generates an image name or a project name of "living room" for a digital image (of a room) that includes image layers with labels of "chair," "couch," "lamp," "coffee table," and "plant." Similarly, the layer generation system generates an image name or a project name of "dining room" for a digital image (of a room) that includes image layers with labels of "dining table," "chair" "plate," "glass," and "bowl." In some cases, the layer generation system utilizes an image name generation machine learning model to generate or predict image names or project names from individual layer labels.

As suggested above, embodiments of the layer generation system provide certain improvements or advantages over conventional digital image editing systems. For example, embodiments of the layer generation system improve accuracy over conventional systems. To elaborate, compared to conventional systems that generate generic default layers and layer labels that inaccurately represent depicted digital content, embodiments of the layer generation system generate layer labels that accurately reflect objects depicted within individual layers. Indeed, the layer generation system can utilize an object classification machine learning model to generate object classifications and can determine layer labels for individual object-specific image layers based on the object classifications. Thus, the layer labels of the layer generation system accurately represent depicted digital content.

In addition, embodiments of the layer generation system improve speed and efficiency relative to conventional digital image editing systems. For example, in contrast to existing systems that require excessive numbers of user interactions to generate image layers, embodiments of the layer generation system require fewer user interactions by generating image layers automatically (e.g., without user interaction defining the image layers). Indeed, the layer generation system can automatically generate image layers that depict individual objects, requiring fewer user interactions than conventional systems, thereby improving speed in generating the image layers. The speed improvement becomes especially pronounced as digital image projects grow more complex, with increasing numbers of objects and layers.

Further, embodiments of the layer generation system improve flexibility over conventional digital image editing systems. More particularly, while existing systems rigidly isolate image generic layers within the digital image projects where they are created, the layer generation system can provide access to intelligently generated image layers across digital image projects. For example, the layer generation system stores image layers within a database accessible across different digital image projects and flexibly facilitates searching for, or otherwise transferring, an image layer generated as part of a first digital image project to a second digital image project. Thus, in contrast to prior systems, the layer generation system can adapt to reuse object-specific image layers across multiple digital image projects, further improving on the speed and efficiency of adding objects and/or layers to digital image projects compared to prior systems.

As suggested by the foregoing discussion, this disclosure utilizes a variety of terms to describe features and benefits of the layer generation system. Additional detail is hereafter provided regarding the meaning of these terms as used in this disclosure. In particular, the term the term "machine learning model" refers to a computer algorithm or a collection of computer algorithms that automatically improve for a particular task through experience based on use of data. For example, a machine learning model can utilize one or more learning techniques to improve in accuracy and/or effectiveness. Example machine learning models include various types of decision trees, support vector machines, Bayesian networks, linear regressions, logistic regressions, random forest models, or neural networks.

As an example machine learning model, the layer generation system utilizes an image segmentation machine learning model. As used herein, the term "image segmentation machine learning model" refers to a machine learning model that segments or partitions a digital image to detect or identify objects depicted within the digital image. For example, an image segmentation machine learning model can include a segmentation neural network that analyzes pixels of a digital image to detect edges or boundaries between objects. Indeed, the image segmentation machine learning model can determine sets of pixels that depict individual objects within a digital image, including pixels within the edges or boundaries of the objects and excluding pixels outside the edges or boundaries.

Additionally, in some embodiments, the layer generation system utilizes an object classification machine learning model. As used herein, the term "object classification machine learning model" refers to a machine learning model that classifies or labels objects depicted within a digital image. For example, an object classification machine learning model analyzes a set of pixels depicting an object (e.g., as indicated by the image segmentation machine learning model) to determine a class or label for the set of pixels. In some cases, an object classification machine learning model is a classification neural network (e.g., a deep neural network) that determines probabilities of a set of pixels corresponding to different classes or labels. The object classification machine learning model can further select a class with a highest probability as a label for the set of pixels.

Relatedly, the term "object classification" refers to a class or category corresponding to an object depicted within a digital image. For example, an object classification includes a class of digital image objects which an object classification machine learning model uses as a comparison for a detected object (e.g., to determine a probability of the detected object belonging to the class). Example object classifications include "glass," "chair," "couch," "person," "plant," "car," "building," and "lamp," among others.

As mentioned, in one or more embodiments the layer generation system generates image layers for objects depicted within a digital image. As used herein, the term "image layer" (or sometimes simply "layer") refers to a digital image or portion of a digital image that can be superimposed or added to another digital image or another portion of a digital image. For example, a layer can include a set of pixels that can be superimposed or added to other pixels of a digital image. Thus, a plurality of digital layers can be added, combined, or joined together to form a digital image. In some implementations, a layer defines pixels that can be edited or modified independently of, and/or superimposed on, other layers (e.g., other portions or subsets of pixels). In some cases, an image layer refers to an object-specific image layer that includes a single object or multiple objects of a single type or classification. Indeed, an image layer can refer to a "combined image layer" that is object-specific but that includes multiple objects of a single type or classification.

In addition, in certain embodiments the layer generation system generates layer labels for image layers. As used herein, the term "layer label" (or sometimes simply "label") refers to a label or name assigned with an image layer. For example, a layer label includes one or more characters that represent or reflect a digital object (or multiple digital objects) depicted within a given image layer. In some cases, a layer label indicates a single object depicted within the layer, while in other cases a layer label indicates multiple objects.

As mentioned, in some cases, the layer generation system facilitates transfer of image layers across different digital image projects. As used herein, the term "digital image project" (or sometimes simply "project") refers to a digital file or group of digital files associated with a digital image editing environment for editing one or more digital images. A digital image project can include a particular file type and can be associated with a particular digital image editing environment or editing application.

In some embodiments, the layer generation system provides selectable layer elements for display within a graphical user interface. As used herein, the term "selectable layer element" (or sometimes simply "layer element") refers to a graphical user interface element corresponding to an image layer (e.g., a user interface element selectable to highlight, identify, modify. or manipulate the image layer). For example, a layer element includes a selectable interface element that is moveable and manipulable to modify or edit an object within a layer corresponding to the layer element.

Additional detail regarding the layer generation system will now be provided with reference to the figures. For example, FIG. 1 illustrates a schematic diagram of an example system environment for implementing a layer generation system 102 in accordance with one or more embodiments. An overview of the layer generation system 102 is described in relation to FIG. 1. Thereafter, a more detailed description of the components and processes of the layer generation system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 108, in some embodiments, the environment includes multiple different client devices, each associated with a different user (e.g., a digital content editor). The client device 108 communicates with the server(s) 104 via the network 114. For example, the client device 108 provides information to server(s) 104 indicating client device interactions (e.g., digital image modifications, selections of layer elements, or other input) and receives information from the server(s) 104 such as image layers, layer labels, and modified digital images. Thus, in some cases, the layer generation system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including modified digital images, generated image layers, project names, and/or layer labels.

As illustrated in FIG. 1, the environment includes the server(s) 104. The server(s) 104 generates, tracks, stores, processes, receives, and transmits electronic data, such as indications of digital image modifications, image layers, layer labels, and project names. For example, the server(s) 104 receives data from the client device 108 in the form of an indication of a client device interaction to modify a digital image. In response, the server(s) 104 transmits data to the client device 108 to cause the client device 108 to display or present a modified digital image and/or to present updated image layers and layer labels based on the modification.

In some embodiments, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server. The server(s) 104 can further access and utilize the database 112 to store and retrieve information such as an image segmentation machine learning model, an object classification machine learning model, one or more digital images, image layers, and/or layer labels.

As further shown in FIG. 1, the server(s) 104 also includes the layer generation system 102 as part of a digital content editing system 106. For example, in one or more implementations, the digital content editing system 106 can store, generate, modify, edit, enhance, provide, distribute, and/or share digital content, such as digital images. For example, the digital content editing system 106 provides tools for the client device 108 to, via the client application 110, modify the appearance of a digital image by adding, removing, or manipulating objects within the digital image. In some implementations, the digital content editing system 106 provides selectable layer elements for display on the client device 108 within a user interface of the client application 110 for manipulating image layers of the digital image.

In one or more embodiments, the server(s) 104 includes all, or a portion of, the layer generation system 102. For example, the layer generation system 102 operates on the server(s) to generate image layers and/or to determine layer labels for the image layers. In some cases, the layer generation system 102 utilizes, locally on the server(s) 104 or from another network location (e.g., the database 112), an image segmentation machine learning model and an object classification machine learning model to determine sets of pixels depicting objects and to determine labels for the sets of pixels.

In certain cases, the client device 108 includes all or part of the layer generation system 102. For example, the client device 108 can generate, obtain (e.g., download), or utilize one or more aspects of the layer generation system 102, such as an image segmentation machine learning model and/or an object classification machine learning model from the server(s) 104. Indeed, in some implementations, as illustrated in FIG. 1, the layer generation system 102 is located in whole or in part of the client device 108. For example, the layer generation system 102 includes a web hosting application that allows the client device 108 to interact with the server(s) 104. To illustrate, in one or more implementations, the client device 108 accesses a web page supported and/or hosted by the server(s) 104.

Although FIG. 1 illustrates a particular arrangement of the environment, in some embodiments, the environment has a different arrangement of components and/or may have a different number or set of components altogether. For instance, as mentioned, the layer generation system 102 is implemented by (e.g., located entirely or in part on) the client device 108. In addition, in one or more embodiments, the client device 108 communicates directly with the layer generation system 102, bypassing the network 114. Further, in some embodiments, the environment includes an image segmentation machine learning model and/or an object classification machine learning model stored in the database 112, maintained by the server(s) 104, the client device 108, or a third-party device.

Figure 2:
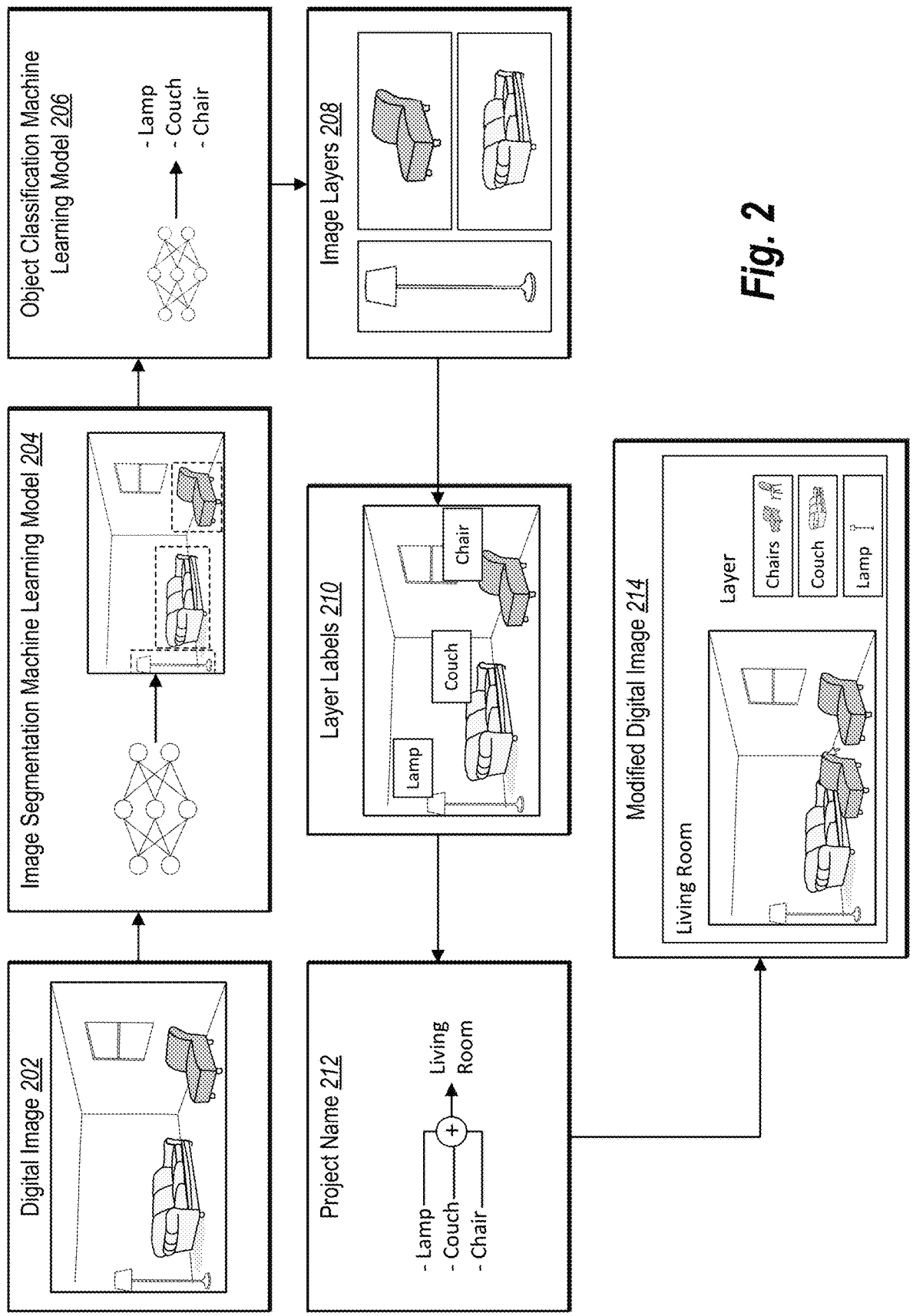
FIG. 2 illustrates an overview of generating image layers and determining layer labels for a digital image in accordance with one or more embodiments.

As mentioned, in one or more embodiments, the layer generation system 102 generates and labels image layers for objects depicted within a digital image. In particular, the layer generation system 102 generates and labels image layers automatically, e.g., without user input selecting and/or labeling objects to include within layers of a digital image. FIG. 2 illustrates an example sequence flow for generating a modified digital image based on image layers in accordance with one or more embodiments.

As illustrated in FIG. 2, the layer generation system 102 accesses or receives a digital image 202. In particular, the layer generation system 102 receives a selection or upload of the digital image 202 via the client device 108. For example, the layer generation system 102 receives an indication of user interaction via the client device 108 to select the digital image 202 from a database (e.g., the database 112) or to upload the digital image 202 to the digital content editing system 106 from the client device 108 (e.g., for editing the digital image 202 via the client application 110). As shown, the digital image 202 depicts a living room scene, including a lamp, a couch, and a chair within the room. In some embodiments, the digital image 202 and the components of the digital image 202 are designed, drawn, and/or created via the client application 110.

As further illustrated in FIG. 2, the layer generation system 102 utilizes an image segmentation machine learning model 204 to segment the digital image 202. More particularly, the layer generation system 102 utilizes the image segmentation machine learning model 204 to analyze pixels of the digital image 202 to determine edges or boundaries between depicted objects. For example, the image segmentation machine learning model 204 determines a set of pixels that depict an individual object and determines other sets of pixels that depict other objects. As shown, the layer generation system 102 utilizes the image segmentation machine learning model 204 to identify objects within the digital image 202, as indicated by the dashed boxes around the objects. Although FIG. 2 illustrates dashed boxes, this is merely a representation for illustrative purposes, and the layer generation system 102 can instead identify only those pixels depicting the individual objects themselves, excluding pixels not part of the objects (e.g., where the boundaries would follow along or track the edges of the objects). Additional detail regarding the image segmentation machine learning model 204 is provided below with reference to subsequent figures.

Additionally, the layer generation system 102 utilizes an object classification machine learning model 206 to determine object classifications for the objects identified within the digital image 202. Indeed, the layer generation system 102 determines object classifications for the sets of pixels identified via the image segmentation machine learning model 204 as depicting or representing respective objects. For example, the layer generation system 102 determines, utilizing the object classification machine learning model 206, probabilities of the sets of pixels belonging to a plurality of candidate object classes or categories. Indeed, the layer generation system 102 compares the sets of pixels with known classes and selects a class with a highest probability (or satisfying a threshold probability) as an object classification for a set of pixels. As shown, the layer generation system 102 generates object classifications of "lamp," "couch," and "chair" for the sets of pixels indicated in the digital image 202. Additional detail regarding the object classification machine learning model 206 is provided below with reference to subsequent figures.

As further illustrated in FIG. 2, the layer generation system 102 generates image layers 208 for the digital image 202. In particular, the layer generation system 102 generates the image layers 208 from the sets of pixels identified via the image segmentation machine learning model 204. For instance, the layer generation system 102 generates a separate image layer for each set of pixels (or for each object) identified within the digital image 202. Indeed, the layer generation system 102 generates the image layers 208 that each represent an individual set of pixels depicting a respective object. In certain embodiments, the layer generation system 102 initially generates a single image layer for the digital image 202 and extracts the individual image layers 208 from the single image layer based on identifying the sets of pixels depicting individual objects via the image segmentation machine learning model 204.

In some cases, the layer generation system 102 generates a combined image layer that includes multiple sets of pixels corresponding to multiple objects of a common object classification or a common object type. For example, if the layer generation system 102 identifies multiple chairs in a digital image, the layer generation system 102 generates a combined image layer that includes all of the chairs together. Additional detail regarding generating the image layers 208 is provided below with reference to subsequent figures.

Additionally, the layer generation system 102 generates or determines layer labels 210. More specifically, the layer generation system 102 determines the layer labels 210 for the image layers 208. For example, the layer generation system 102 generates the layer labels 210 from the object classifications generated via the object classification machine learning model 206. As shown, the layer labels 210 include "lamp," "couch," and "chair" for the corresponding sets of pixels within the digital image 202. Indeed, the layer generation system 102 matches or correlates the object classifications generated via the object classification machine learning model 206 with the corresponding image layers 208 generated from the sets of pixels identified via the image segmentation machine learning model 204. Additional detail regarding determining the layer labels 210 is provided below with reference to subsequent figures.

As further illustrated in FIG. 2, in some embodiments, the layer generation system 102 generates a project name 212 for the digital image project associated with the digital image 202. To elaborate, the layer generation system 102 determines a name for the digital image 202 or for the digital image project associated with the client application 110 used to modify the digital image 202. For example, the layer generation system 102 determines the project name (or the digital image name) from the layer labels 210. In some cases, the layer generation system 102 determines the project name 212 by combining the layer labels 210 into an amalgamation of the layer labels 210, such as "lamp_couch_chair." For instance, the layer generation system 102 utilizes each of the layer labels 210 (or a threshold number of the layer labels 210) within the project name 212.

In some embodiments, the layer generation system 102 generates the project name 212 by extrapolating from the layer labels 210. Particularly, the layer generation system 102 generates the project name 212 to describe the layer labels 210 (e.g., using words not included in the layer labels 210) such as by generating the name "living room" corresponding to the digital image 202. Indeed, in some embodiments, the layer generation system 102 analyzes the entire digital image 202 together with the layer labels 210 to determine that the digital image 202 depicts a room that includes a lamp, a chair, and a couch. Based on identifying the room including these three objects, the layer generation system 102 determines that "living room" is an appropriate project name 212.

In some cases, the layer generation system 102 utilizes an image name generation machine learning model to generate the project name 212 from the layer labels 210. For instance, the image name generation machine learning model can generate predictions or probabilities of the layer labels 210 corresponding to various of project names, and the layer generation system 102 can select the project name with the highest probability (or that satisfies a threshold probability). For example, the layer generation system 102 combines the layer labels 210 into a single text string and utilizes the image name generation machine learning model to determine which of a set of candidate project names corresponds to the text string.

In some cases, the layer generation system 102 generates the project name 212 based on positioning and/or size of the objects within the digital image 202. For example, the layer generation system 102 determines a number of the image layers 208 (or a number of sets of pixels or objects) within the digital image 202 that correspond to each of the layer labels 210 (e.g., 2 chairs, 3 lamps, 1 couch, etc.). In some cases, the layer generation system 102 further generates the project name 212 based on the numbers by, for example, ordering the layer labels in the project name 212 according to population in the digital image 202 (e.g., "lamp_chair_couch" because lamp is the most populous, followed by chair and couch in order). In these or other cases, the layer generation system 102 includes the numbers corresponding to each of the layer labels 210 in the project name 212, such as "3lamps_2chairs_1couch."

As another example, the layer generation system 102 determines the project name 212 based on sizes of objects or sets of pixels within the various image layers 208. For example, the layer generation system 102 determines areas covered by each of sets of pixels within the image layers 208, respectively. Further, the layer generation system 102 generates the project name 212 in order of their respective sizes, such as "couch_chair_lamp" to indicate that the couch is the largest (e.g., has the largest pixel area in the digital image 202), followed by the chair and the lamp.

In certain embodiments, the layer generation system 102 determines the project name 212 based on relative positions of objects within the digital image 202. For example, the layer generation system 102 determines pixel coordinates of the sets of pixels corresponding to the depicted objects of the image layers 208. The layer generation system 102 can further generate the project name 212 according to the pixel coordinates by, for example, using the corresponding layer labels 210 from left to right, from front to back (e.g., foreground to background), or in some other location-based order. Thus, the layer generation system 102 can generate a project name 212 of "lamp_couch_chair" according to the locations of the depicted objects from left to right. In certain cases, the layer generation system 102 includes location indicators within the project name 212 to indicate where the objects are located relative to one another. For instance, the layer generation system 102 generates a project name 212 of "lamp_left_of_couch_left_of_chair" for the digital image 202.

In one or more implementations, the layer generation system 102 determines the project name 212 based on context of user interactions. To elaborate, the layer generation system 102 determines which sets of pixels (or which objects) a user interacts with. For example, the layer generation system 102 detects one or more sets of pixels most recently selected and/or modified (e.g., a most recent 3 or 5 selected sets of pixels) within the digital image 202. The layer generation system 102 thus generates the project name 212 based on which sets of pixels the user interacts with by combining the corresponding label layers together (e.g., in chronological order of the interactions). In some embodiments, the layer generation system 102 utilizes two or more of the aforementioned techniques or methods together to generate the project name 212.

As further illustrated in FIG. 2, the layer generation system 102 generates a modified digital image 214. In particular, the layer generation system 102 generates the modified digital image 214 based on user interaction (e.g., via the client application 110 on the client device 108) to edit or modify the digital image 202. For example, the layer generation system 102 receives an indication of user interaction to modify an object depicted within the digital image 202. In some cases, the layer generation system 102 receives the indication of the user interaction in the form of a selection of a selectable layer element within a digital image editing interface (e.g., to add a copy of the corresponding image layer). Indeed, as shown in FIG. 2, the layer generation system 102 receives an indication of user interaction to add a copy of the "chair" layer to the digital image 202.

Based on generating the modified digital image 214 with the new chair layer, the layer generation system 102 further updates the image layers 208 and the layer labels 210. To elaborate, the layer generation system 102 utilizes the image segmentation machine learning model 204 and the object classification machine learning model 206 to identify new object-specific sets of pixels and corresponding object classifications for the modified digital image 214. The layer generation system 102 further generates new image layers and corresponding layer labels from the identified sets of pixels and the corresponding object classifications as described herein. For instance, the layer generation system 102 generates a combined image layer to include both depicted chairs. As shown, the layer generation system 102 further updates the layer label for the chair label by making it plural ("chairs") to indicate that the layer includes multiple chairs. In some cases, however, the layer generation system 102 generates a separate layer for the newly added chair and does not include the new chair within the same layer as the original chair.

Figure 3:
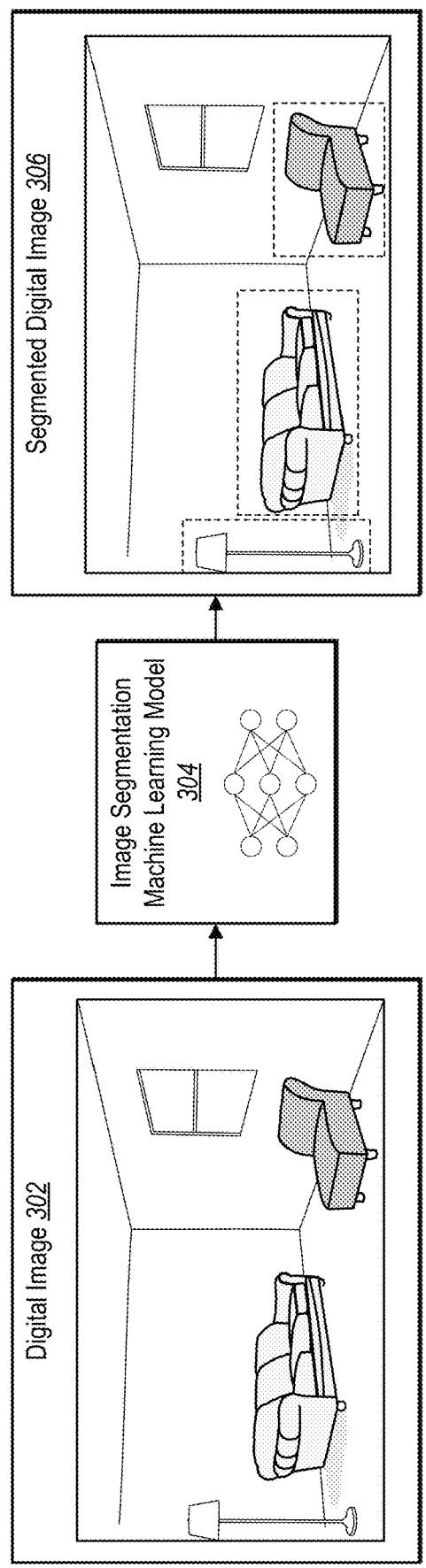
FIG. 3 illustrates an example of detecting sets of pixels depicting objects utilizing an image segmentation machine learning model in accordance with one or more embodiments.

As mentioned, in certain described embodiments, the layer generation system 102 utilizes an image segmentation machine learning model to identify or detect sets of pixels depicting objects within a digital image. In particular, the layer generation system 102 determines a set of pixels for each individual object identified within a digital image. FIG. 3 illustrates generating a segmented digital image indicating individual object-specific sets of pixels in accordance with one or more embodiments.

As illustrated in FIG. 3, the layer generation system 102 inputs a digital image 302 into an image segmentation machine learning model 304 (e.g., the image segmentation machine learning model 204). The image segmentation machine learning model 304, in turn, analyzes or processes the pixels of the digital image 302 to segment groups of pixels. For instance, the image segmentation machine learning model 304 detects edges or boundaries between sets of pixels by comparing pixel values. By thus comparing pixel values, the image segmentation machine learning model 304 determines edges or boundaries between sets or pixels within the digital image 302 to delineate between the different portions of the digital image 302. Indeed, by utilizing the image segmentation machine learning model 304, the layer generation system 102 can identify that one segment or set of pixels is different from another based on their respective pixel values. For instance, the layer generation system 102 can determine one set of pixels for the couch in the digital image 302, another set of pixels for the floor under the couch, and a third set of pixels for the wall behind the couch, thus distinguishing the set of pixels depicting the couch from pixels in the surrounding area.

By detecting the sets of pixels utilizing the image segmentation machine learning model 304 in this fashion, the layer generation system 102 generates the segmented digital image 306. Indeed, the segmented digital image 306 depicts different sets of pixels for individual objects identified from the digital image 302. For instance, the segmented digital image 306 illustrates a first set of pixels depicting an object in the shape of a lamp, a second set of pixels depicting an object in the shape of a couch, and a third set of pixels depicting an object in the shape of a chair. Although not indicated in FIG. 3, the layer generation system 102 can further identify sets of pixels for other objects or background portions of the digital image 302 as well, such as a set of pixels depicting a wall, a set of pixels depicting a window, a set of pixels depicting a ceiling, and a set of pixels depicting a floor. Additionally, while the segmented digital image 306 indicates the individual sets of pixels with dashed boxes, in some cases, the layer generation system 102 generates a segmented digital image that highlights (or otherwise indicates) the different sets of pixels corresponding to the respective segments as identified by the image segmentation machine learning model 304. Indeed, in some cases, a set of pixels for an object includes only those pixels representing the object and excludes other pixels, tightly tracking the edge or border of the object.

In some embodiments, the image segmentation machine learning model 304 includes one or more layers or components of a specific segmentation neural network or other segmentation machine learning model. For example, the image segmentation machine learning model 304 can refer to the DETECTRON 2 model described by Yuxin Wu, Alexander Kirillov, Francisco Massa, Wan-Yen Lo, and Ros Girshick in Detectron2, https://github.com/facebookresearch/detectron2, which is incorporated herein by reference in its entirety. In some embodiments, the image segmentation machine learning model 304 refers to a different model such as the model described in U.S. Application Publication No. 2019/0130229 entitled "Deep Salient Content Neural Networks for Efficient Digital Object Segmentation," filed Oct. 31, 2017, or the model described in U.S. patent application Ser. No. 16/035,410 entitled "Automatic Trimap Generation and Image Segmentation," filed on Jul. 13, 2018, or the model described in U.S. Pat. No. 10,192,129 entitled "Utilizing Interactive Deep Learning to Select Objects in Digital Visual Media," filed Nov. 18, 2015, all of which are incorporated herein by reference in their entireties.

In certain cases, the layer generation system 102 trains or tunes the image segmentation machine learning model 304 to learn parameters for accurately detecting sets of pixels depicting individual objects. For example, the layer generation system 102 trains the image segmentation machine learning model 304 utilizing sample digital images and corresponding ground truth segments or sets of pixels (e.g., ground truth segmented digital images). Indeed, the layer generation system 102 utilizes an iterative training process to learn the parameters of the image segmentation machine learning model 304, inputting, for each iteration, a new sample digital image into the image segmentation machine learning model 304 and comparing a prediction generated by the image segmentation machine learning model 304 against ground truth data until the image segmentation machine learning model 304 satisfies a threshold accuracy or a threshold measure of loss.

For a training iteration, the layer generation system 102 selects a sample digital image (e.g., from the database 112) to input into the image segmentation machine learning model 304. The image segmentation machine learning model 304, in turn, generates predicted sets of pixels or segmentations within a segmented digital image. The layer generation system 102 further compares the predicted segmented digital image with a ground truth segmented digital image corresponding to the sample digital image and indicating actual ground truth segments. For the comparison, the layer generation system 102 utilizes a loss function such as a mean square error loss function or a cross entropy loss function to determine a measure of loss between the prediction and the ground truth. The layer generation system 102 further modifies (e.g., via back propagation) internal parameters such as weights and biases of the image segmentation machine learning model 304 to reduce the measure of loss. The layer generation system 102 repeats this process until the measure of loss satisfies a threshold and the image segmentation machine learning model 304 predicts accurate segmentations.

Figure 4:
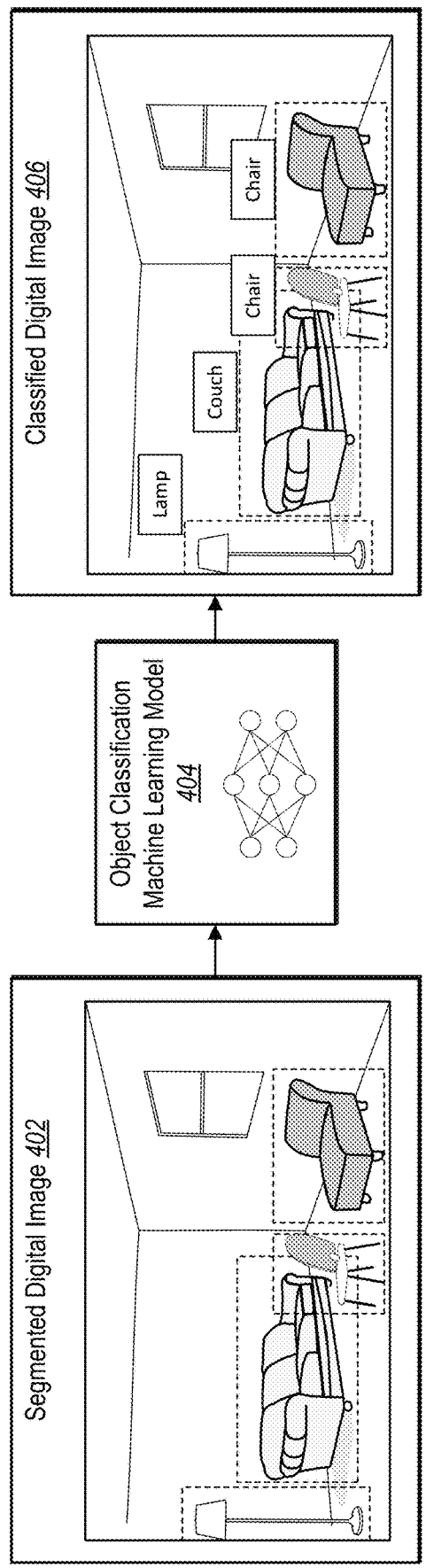
FIG. 4 illustrates an example of determining object classifications for sets of pixels utilizing an object classification machine learning model in accordance with one or more embodiments.

As mentioned above, in certain described embodiments, the layer generation system 102 generates or determines object classifications for objects within a digital image. In particular, the layer generation system 102 utilizes an object classification machine learning model to determine object classifications corresponding to sets of pixels identified via an image segmentation machine learning model. FIG. 4 illustrates generating object classifications utilizing an object classification machine learning model in accordance with one or more embodiments.

As illustrated in FIG. 4, the layer generation system 102 accesses or generates a segmented digital image 402. In particular, the layer generation system 102 generates the segmented digital image 402 utilizing the image segmentation machine learning model 304 as described above. As shown, the segmented digital image 402 indicates four sets of pixels depicting four different objects, delineated by the dashed boxes.

The layer generation system 102 further inputs the segmented digital image 402 into the object classification machine learning model 404. The object classification machine learning model 404, in turn, generates object classifications for the sets of pixels within the segmented digital image 402. Indeed, the object classification machine learning model 404 analyzes the individual sets of pixels (e.g., one at a time) to determine corresponding classes or categories. For instance, the object classification machine learning model 404 compares a set of pixels depicting a first object against a plurality of candidate object classifications to determine respective probabilities that the set of pixels belongs to each candidate object classification. The object classification machine learning model 404 selects the object classification with the highest probability of corresponding to the set of pixels as the object classification for the set of pixels. The layer generation system 102 repeats the process of utilizing the object classification machine learning model 404 to generate an object classification for each set of pixels.

Indeed, as shown in FIG. 4, the layer generation system 102 utilizes the object classification machine learning model 404 to generate the classified digital image 406 which includes object classifications for each of the sets of pixels from the segmented digital image 402. As illustrated, the object classification machine learning model 404 generates object classifications of "lamp," "couch," "chair," and "chair" for the indicated sets of pixels.

In some embodiments, the object classification machine learning model 404 generates object classifications on a more granular level. For example, rather than generating the same object classification for the two sets of pixels depicting chairs of differing style, the object classification machine learning model 404 distinguishes between the two types of chair with different object classifications (e.g., "lounge chair" and "hardback chair"). Along these lines, the object classification machine learning model 404 can generate object classifications such as "floor lamp," "loveseat," or other more detailed object classifications.

Indeed, in some cases, the object classification machine learning model 404 determines object classifications according to size, variety, or color of a depicted object. For instance, the layer generation system 102 utilizes the object classification machine learning model 404 to generate an object classification such as "green chair," "tall brown lamp," or "pine tree" (as opposed to generic classifications of "chair," "lamp," and "tree"). Thus, in cases where a digital image such as the segmented digital image 402 includes multiple chairs (or other objects), the layer generation system 102 can nevertheless distinguish between the different objects based on their respective classifications (e.g., "lounge chair" and "hardback chair").

The image segmentation machine learning model 304 can be part of (or separate from) the object classification machine learning model 404. To illustrate, in some embodiments, the layer generation system 102 utilizes a panoptic segmentation model that both segments and applies a label to an object portrayed in a digital image. In some embodiments, the object classification machine learning model 404 includes one or more layers or components of a classification neural network or other classification machine learning model such as DETECTRON 2. In other embodiments, the object classification machine learning model 404 includes an object classification model such as the models described in U.S. patent application Ser. No. 16/388,115 entitled "Robust Training of Large-Scale Object Detectors with Noisy Data," filed Apr. 8, 2019 or the models described by S. Ren, K. He, R. Girshick, and J. Sun in *Faster r-cnn: Towards real-time object detection with region proposal networks*, NIPS 2015, both of which are incorporated herein by reference in their entireties.

In certain implementations, the layer generation system 102 can train or tune the object classification machine learning model 404. More specifically, the layer generation system 102 can learn parameters of the object classification machine learning model 404 to accurately determine object classifications for a digital image. Indeed, similar to the aforementioned training description of the image segmentation machine learning model 304, the layer generation system 102 performs an iterative training process for a number of iterations until the object classification machine learning model 404 accurately classifies objects.

In a training iteration, for example, the layer generation system 102 selects a sample digital image (e.g., a sample digital image depicting one or more objects). The layer generation system 102 further inputs the sample digital image into the object classification machine learning model 404, whereupon the object classification machine learning model 404 generates a predicted object classification for each depicted object. Additionally, the layer generation system 102 compares the predicted object classification(s) against ground truth object classification(s) indicating actual object classifications for the object(s) within the sample digital image. For the comparison, the layer generation system 102 utilizes a loss function such as a cross entropy loss function or a mean square error loss function to determine a measure of loss between the prediction and the ground truth. The layer generation system 102 further modifies (e.g., via back propagation) parameters such as internal weights and biases of the object classification machine learning model 404 to reduce the measure of loss. As mentioned, the layer generation system 102 repeats this process of predicting object classifications for different digital images to compare with corresponding ground truth classifications for a threshold number of iterations or until the predictions satisfy a threshold measure of loss.

Figure 5:
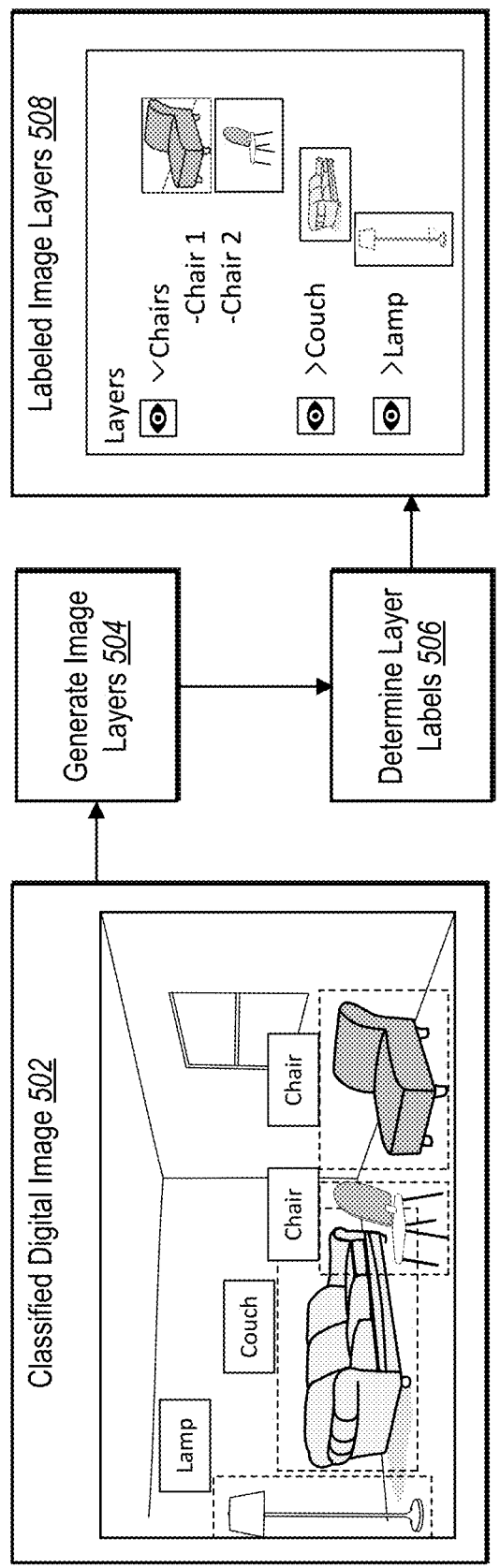
FIG. 5 illustrates an example process for generating image layers and determining layer labels for a digital image in accordance with one or more embodiments.

As mentioned above, in certain embodiments, the layer generation system 102 generates image layers and layer labels for a digital image. In particular, the layer generation system 102 generates image layers and layer labels according to identified sets of pixels and corresponding object classifications. FIG. 5 illustrates generating image layers and determining corresponding layer labels in accordance with one or more embodiments.

As illustrated in FIG. 5, the layer generation system 102 generates or accesses a classified digital image 502 (e.g., the classified digital image 406). For example, the layer generation system 102 generates the classified digital image 502 by detecting objects and determining object classifications in accordance with the description above. As shown, the classified digital image 502 includes four sets of pixels depicted four individual objects along with corresponding object classifications of "lamp," "couch," "chair," and "chair."

As further illustrated in FIG. 5, the layer generation system 102 performs an act 504 to generate image layers. In particular, the layer generation system 102 generates images layers for the classified digital image 502. Indeed, the layer generation system 102 generates an image layer for each of the sets of pixels indicated or identified within the classified digital image 502. For instance, the layer generation system 102 generates an image layer for the first set of pixels corresponding to the "lamp" object classification, an image layer for the second set of pixels corresponding to the "couch" object classification, an image layer for the third set of pixels corresponding to the "chair" object classification, and an image layer for the fourth set of pixels corresponding to the "chair" object classification.

In some embodiments, the layer generation system 102 generates a single image layer for the classified digital image 502 that includes all of the identified objects. In addition, the layer generation system 102 extracts each individual object-specific image layer from the single layer. For example, the layer generation system 102 extracts object-specific layers from the single layer according to the segmentation indicating the sets of pixels depicting the objects. Indeed, based on detecting the sets of pixels utilizing the image segmentation machine learning model 304, the layer generation system 102 determines the individual sets of pixels to include within each respective object-specific image layer.

In one or more implementations, the layer generation system 102 receives an indication of user interaction to group one or more sets of pixels together within a single layer. For instance, the layer generation system 102 receives an indication to group a set of pixels depicting an object classified as "couch" together with a set of pixels depicting an object classified as "chair." In response to the user interaction to group sets of pixels together, the layer generation system 102 generates an image layer than includes both sets of pixels. In some cases, the layer generation system 102 further provides an option to extract layers and separate the sets of pixels into individual image layers.

In some cases, the layer generation system 102 generates combined image layers. For example, the layer generation system 102 identifies image layers that have matching object classifications to group together in a combined image layer. Indeed, the layer generation system 102 compares object classifications for sets of pixels and groups sets of pixels that have matching object classifications within a combined image layer. As shown, the layer generation system 102 determines that both sets of pixels classified as "chair" have matching object classifications and can therefore be grouped into a combined image layer.

The layer generation system 102 can also generate combined image layers in cases where the layer generation system 102 generates more detailed object classifications that indicate sizes, colors, shapes, and/or varieties of various objects. For example, in some embodiments the layer generation system 102 identifies sets of pixels with object classifications indicating a size of an object such as "large couch" or "small couch." In certain cases, the layer generation system 102 distinguishes between small and large sets of pixels based on a threshold pixel area. In other cases, the layer generation system 102 distinguishes sizes based on a discrepancy between two compared sets of pixels. For instance, if the layer generation system 102 determines a threshold area difference (e.g., 100 pixels) between two objects of the same object classification, then the layer generation system 102 separates the objects into different layers and labels them with size modifiers (e.g., "small" and "large") accordingly. In some embodiments, the layer generation system 102 determines a size of a set of pixels based on its occupied area relative to a total area of a digital image. The layer generation system 102 thus labels an image layer with a "large" modifier if the set of pixels occupies a threshold percentage of a digital image and labels an image layer with a "small" modifier if the set of pixels occupies less than a threshold percentage of the digital image area (e.g., the same or different threshold than that of the "large" modifier). The layer generation system 102 can further provide an option to combine the two image layers into a combined image layer for both sets of pixels.

As another example, the layer generation system 102 identifies sets of pixels with object classifications indicating colors of objects such as "green lamp" or "orange lamp." As yet another example, the layer generation system 102 identifies sets of pixels with object classifications indicating varieties or types of objects such as "lounge chair" and "hardback chair" (or other varieties such as plant species, car models, or person sexes). In these examples, the layer generation system 102 does not group the sets of pixels into combined image layer because the object classifications do not match. Indeed, in some cases, the layer generation system 102 only groups sets of pixels together in a combined image layer if their object classifications match. If the layer generation system 102 identifies five chairs, for example, three of which are white and two of which are brown, the layer generation system 102 can generate two combined image layers, one that includes the three white chairs and another that includes the two brown chairs.

In certain embodiments, as part of generating image layers (e.g., via the act 504) the layer generation system 102 performs additional analysis or processing of sets of pixels after object classification. For example, the layer generation system 102 analyzes sets of pixels to further determine if the sets of pixels belong in separate image layers or in a combined image layer. In some cases, the layer generation system 102 analyzes and compares sets of pixels with matching object classifications to determine similarities between the sets of pixels. For instance, the layer generation system 102 generates similarity scores between sets of pixels with matching object classifications. If a similarity score satisfies a threshold similarity score, the layer generation system 102 groups the sets of pixels in a combined image layer. If, on the other hand, a similarity score fails to satisfy the threshold similarity score, the layer generation system 102 generates separate image layers for the sets of pixels. For example, given the two sets of pixels in the classified digital image 502 with the object classification of "chair," the layer generation system 102 compares the sets of pixels to determine that they do not satisfy a threshold similarity and, therefore, generates separate image layers for each set of pixels.

As further illustrated in FIG. 5, the layer generation system 102 performs an act 506 to determine layer labels. More specifically, the layer generation system 102 generates or determines labels for the image layers generated via the act 504. In some embodiments, the layer generation system 102 generates layer labels according to object classifications corresponding to the sets of pixels associated with the respective image layers. For instance, the layer generation system 102 determines a layer label of "lamp" for the image layer including the set of pixels depicting the object classified as "lamp." Likewise, the layer generation system 102 similarly generates layer labels for the image layers for the "couch," "chair," and "chair" as well. For more detailed object classifications (e.g., "lounge chair" or "hardback chair"), the layer generation system 102 can similarly assign layer labels.

In certain implementations, the layer generation system 102 determines layer labels to indicate additional details regarding an image layer, such as color, number, size, or variety. For instance, the layer generation system 102 determines a number of instances of an object classification and assigns a number to each instance. The layer generation system 102 thus generates layer labels to indicate the assigned numbers. As shown, the layer generation system 102 determines two instances of the "chair" object classification, and the layer generation system 102 therefore assigns layer labels of "chair 1" and "chair 2." In some cases, the layer generation system 102 assigns a number to an image layer based on when the image layer was created or added to a digital image (e.g., where earlier image layers have smaller numbers). In other cases, the layer generation system 102 assigns a number based on relative position (e.g., from left to right, right to left, or foreground to background). In these or other cases, the layer generation system 102 assigns a number to a combined image layer to indicate the number of instances of an object within the layer (e.g., "2 chairs").

In some embodiments, the layer generation system 102 generates a layer label for a layer that includes multiple sets of pixels depicting different objects. For instance, the layer generation system 102 generates an image layer that includes a couch and a lamp. As a result, the layer generation system 102 determines a layer label that includes labels for both objects (e.g., "couch_lamp"). In some cases, the layer generation system 102 determines the order of the labels for the respective objects based on relative placement (e.g., from left to right or foreground to background) or relative age within the digital image (e.g., by labeling the objects in order of when they were added to the image). In these or other cases, the layer generation system 102 determines the order of the labels for the respective objects based on area occupied within the digital image (e.g., by labeling the objects in order of the area of their sets of pixels).

As further illustrated in FIG. 5, the layer generation system 102 generates labeled image layers 508. Indeed, by performing the acts 504 and 506, the layer generation system 102 generates the labeled image layers 508 that indicate the image layers generated from the classified digital image 502, along with their respective layer labels. For instance, the labeled image layers 508 include two chair layers, "chair 1" and "chair 2," along with a "couch" layer and a "lamp" layer. As shown, the layer generation system 102 provides selectable layer elements for each of the image layers. The layer generation system 102 modifies a set of pixels corresponding to a layer based on user interaction with a layer element.

In some cases, the layer generation system 102 provides the image layers "chair 1" and "chair 2" within a combined image layer "chairs." Indeed, in some cases, a combined image layer includes multiple constituent layers, where the combined image layer and each constituent layer has its own layer element selectable to modify the corresponding layer. In other cases, the "chairs" label is an expandable header (and not necessarily a combined image layer) indicating that there are multiple individual "chair" layers nested within. In some cases, the layer generation system 102 generates a header (or a combined image layer) corresponding to a broader classification (e.g., a genus) of objects that includes one or more image layers of narrower classifications (e.g., species).

As mentioned above, in some embodiments the layer generation system 102 updates the labeled image layers 508 in response to edits or modifications made to a digital image (or to one of the image layers). Indeed, the layer generation system 102 re-performs the acts 504 and 506 in response to edits or modifications to a digital image (e.g., the classified digital image 502). In particular, in addition to re-utilizing the image segmentation machine learning model 304 and the object classification machine learning model 404 after each edit or modification to detect and determine object classifications for sets of pixels depicting individual objects, the layer generation system 102 further generates image layers and determines layer labels after each edit or modification as well.

Indeed, the layer generation system 102 updates the image layers to add or remove image layers based on additions or deletions made via user interaction. As another example, the layer generation system 102 converts a normal image layer to a combined image layer based on user interaction to add a new object with an object classification matching an existing object. In some embodiments, the layer generation system 102 also pluralizes the layer label of a combined image layer to indicate multiple instances of the depicted object (e.g., "chairs"). Further, the layer generation system 102 updates number indications within layer labels based on movements, additions, or deletions of objects. For example, the layer generation system 102 adds a new image layer with the label "chair 3" based on user interaction to add a new chair. As another example, the layer generation system 102 updates the "chair 2" image label to simply read "chair" based on user interaction to delete the "chair 1" image layer.

In some embodiments, the layer generation system 102 provides an extract layers option to separate image layers. To elaborate, in response to user selection of an extract layers option, the layer generation system 102 extracts individual sets of pixels within a combined image layer into individual image layers. Indeed, if any layer includes more than one object, the layer generation system 102 provides the extract layers option to separate the multiple objects into respective image layers with their own layer labels.

In some embodiments, the layer generation system 102 performs a step for automatically generating a labeled image layer for the set of pixels according to an object classification of the object. The above description of FIG. 5, including the supporting description of FIGS. 3-4, provide various embodiments and supporting acts and algorithms for performing a step for automatically generating a labeled image layer for the set of pixels according to an object classification of the object.

For example, in some embodiments, a step for automatically generating a labeled image layer for the set of pixels according to an object classification of the object includes detecting sets of pixels depicting individual objects within a digital image utilizing an image segmentation machine learning model (e.g., as described in relation to FIG. 3). In some embodiments, a step for automatically generating a labeled image layer for the set of pixels according to an object classification of the object also includes generating object classifications for the sets of pixels within the digital image utilizing an object classification machine learning model (e.g., as described in relation to FIG. 4). In these or other embodiments, a step for automatically generating a labeled image layer for the set of pixels according to an object classification of the object includes generating image layers and determining layer labels as described in relation to FIG. 5, and particularly in relation to acts 504 and 506.

Figure 6:
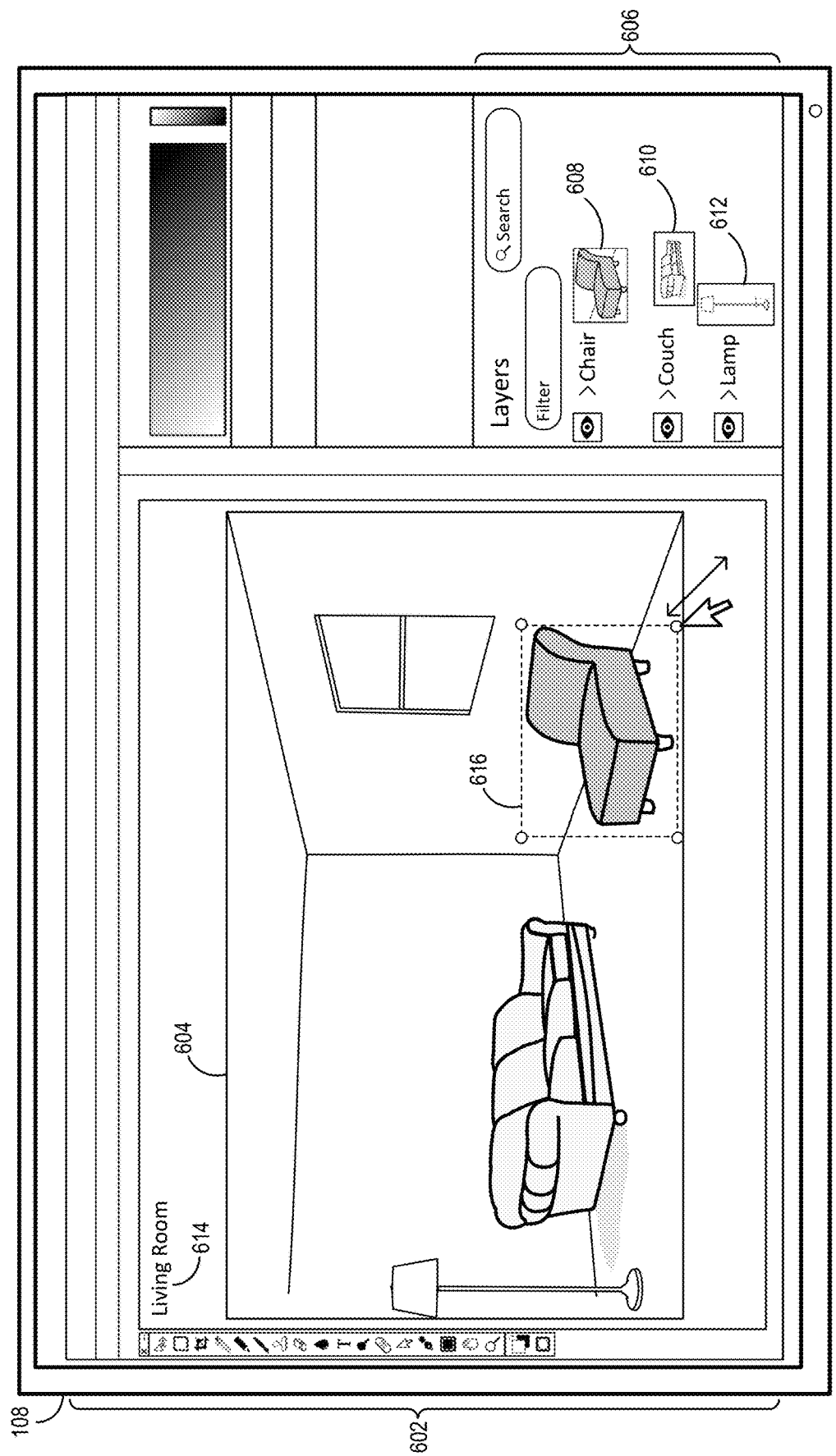
FIG. 6 illustrates an example digital image editing interface for modifying image layers in accordance with one or more embodiments.

As mentioned above, in certain described embodiments, the layer generation system 102 provides image layers for display within a graphical user interface displayed on a client device. In particular, the layer generation system 102 provides tools and options for modifying or otherwise manipulating image layers via a digital image editing interface displayed via the client device 108. FIG. 6 illustrates modifications to image layers of a digital image displayed within a digital image editing interface 602 in accordance with one or more embodiments.

As illustrated in FIG. 6, the layer generation system 102 provides the digital image editing interface 602 for display via the client device 108 as part of the client application 110. Within the digital image editing interface 602, the layer generation system 102 further provides a layers pane 606 for display. The layers pane 606 includes various selectable user interface elements such as layer element 608, layer element 610, and layer element 612, along with a filter bar for filtering image layers. Along with the layers pane 606, the digital image editing interface 602 includes a digital image 604 depicting a room with various objects. Additionally, the digital image editing interface 602 includes a project name 614 (or a digital image name) of "Living Room." As described above, the layer generation system 102 generates the project name 614 from layer labels associated with the image layers within the digital image 604.

As further illustrated in FIG. 6, the layer generation system 102 receives an indication of user interaction to edit or modify the digital image 604. Specifically, the layer generation system 102 receives a resizing action from the client device 108, as indicated by the bounding box 616, to resize a selected object—in this case, the depicted chair. In some cases, the layer generation system 102 receives user interaction for other modifications such as additions, deletions, line or curve modifications, color changes, rotations, relocations, or other edits to objects within the digital image 604.

In response to the user interaction to resize the chair (or in response to some other edit or modification), the layer generation system 102 updates the image layers and corresponding layer labels indicated within the layers pane 606. For example, the layer generation system 102 updates the image layers to include the sets of pixels associated with their depicted objects by increasing or decreasing the area of the set of pixels within the chair layer, depending on the direction of the resizing action. In some cases, the layer generation system 102 further updates the layer label for the chair to "small chair" or "large chair," depending on the direction of the resizing. Additionally, the layer generation system 102 adds, removes, or modifies image layers and layer labels based on user interaction for adding a new object, removing an existing object, or changing an existing object in the digital image 604.

For example, the layer generation system 102 removes an image layer and its corresponding layer element from the layers pane 606 in response to user interaction deleting an object from the digital image 604. In addition, the layer generation system 102 adds a new image layer to the digital image 604 and adds a corresponding layer element with a layer label to the layers pane 606 in response to user interaction adding a new object to the digital image 604. Further, the layer generation system 102 modifies a set of pixels associated with an image layer and depicted within a layer element in response to user interaction to modify an object depicted within the digital image 604. The layer generation system 102 further modifies a layer label according to the modification as well. For instance, changing the chair from brown to green results in updating the layer label from "brown chair" to "green chair."

Figure 7:
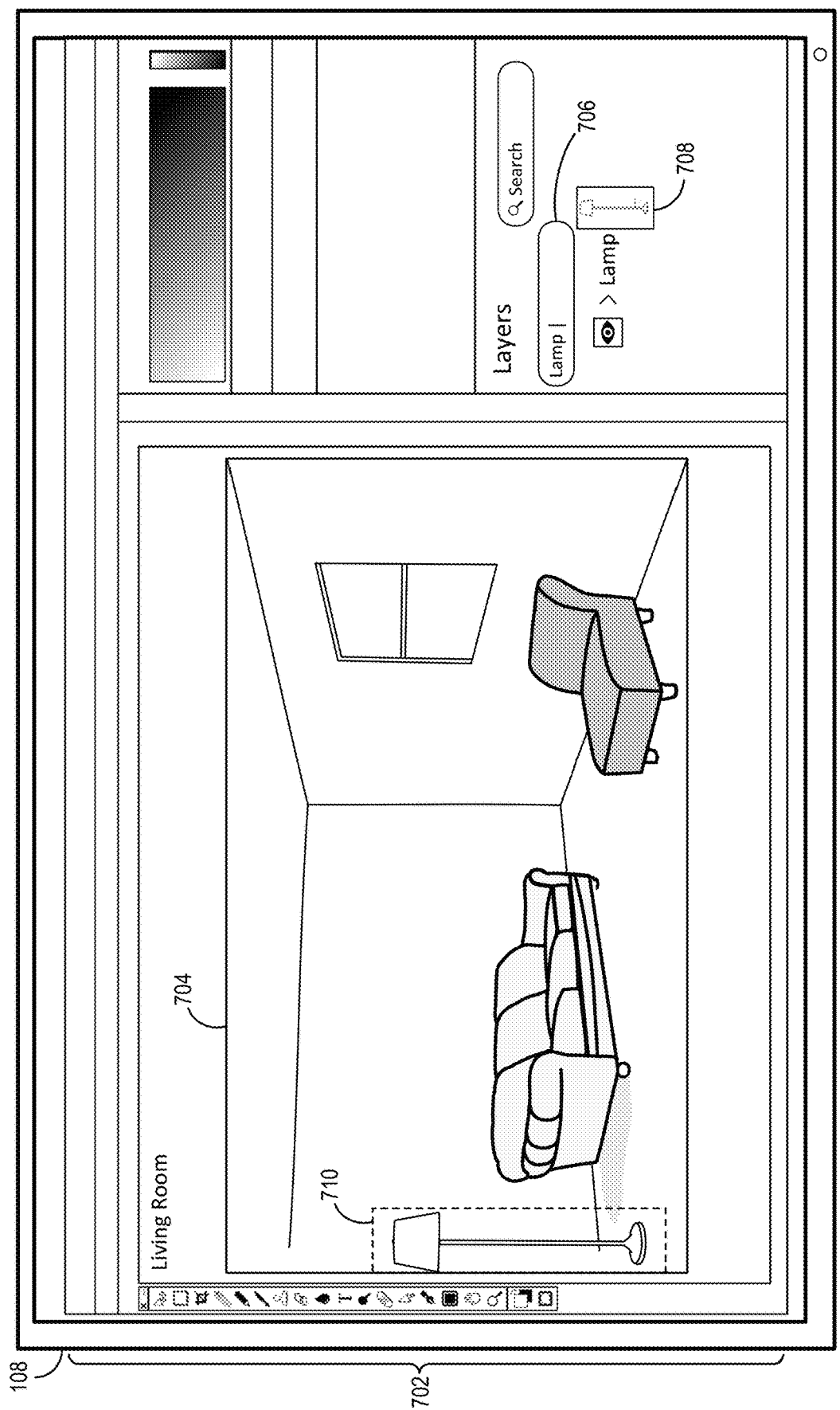
FIG. 7 illustrates an example digital image editing interface for filtering image layers in accordance with one or more embodiments.

As mentioned above, in certain embodiments, the layer generation system 102 filters image layers for digital images. In particular, the layer generation system 102 receives an indication of a filter and/or search query to filter and/or search image layers of a digital image. The layer generation system 102 can identify image layers that do correspond to the query. FIG. 7 illustrates an example user interface for filtering image layers in accordance with one or more embodiments.

As illustrated in FIG. 7, the layer generation system 102 provides a digital image editing interface 702 for display on the client device 108. The digital image editing interface 702 includes a digital image 704 and a filter bar 706. As shown, the layer generation system 102 receives a filter query of "lamp" via the filter bar 706. In response to the filter query, the layer generation system 102 identifies image layers within the digital image 704 that correspond to the filter query and further identifies image layers that do not correspond to the filter query. For instance, the layer generation system 102 compares the filter query with layer labels of the various image layers to identify which layer labels correspond to the filter query. In some embodiments, the layer generation system 102 filters out, or removes from view, image layers and/or layer elements that do not correspond to the filter query. Indeed, the layer generation system 102 selects for presentation image layers and/or layer elements that correspond to the filter query.

As shown, in response to the "lamp" filter query, the layer generation system 102 filters out all image layers and/or layer elements except the "lamp" layer element 708 which remains visible. In some embodiments, based on the filter query, the layer generation system 102 further highlights or otherwise indicates the corresponding set of pixels of the lamp layer within the digital image 704. As shown, the layer generation system 102 highlights the lamp layer with a dashed box 710. In some cases, the layer generation system 102 highlights the lamp layer by highlighting only the set of pixels depicting the lamp (e.g., with a translucent color overlay). In certain embodiments, the layer generation system 102 highlights a set of pixels based on user interaction selecting a corresponding layer element.

Figure 8:
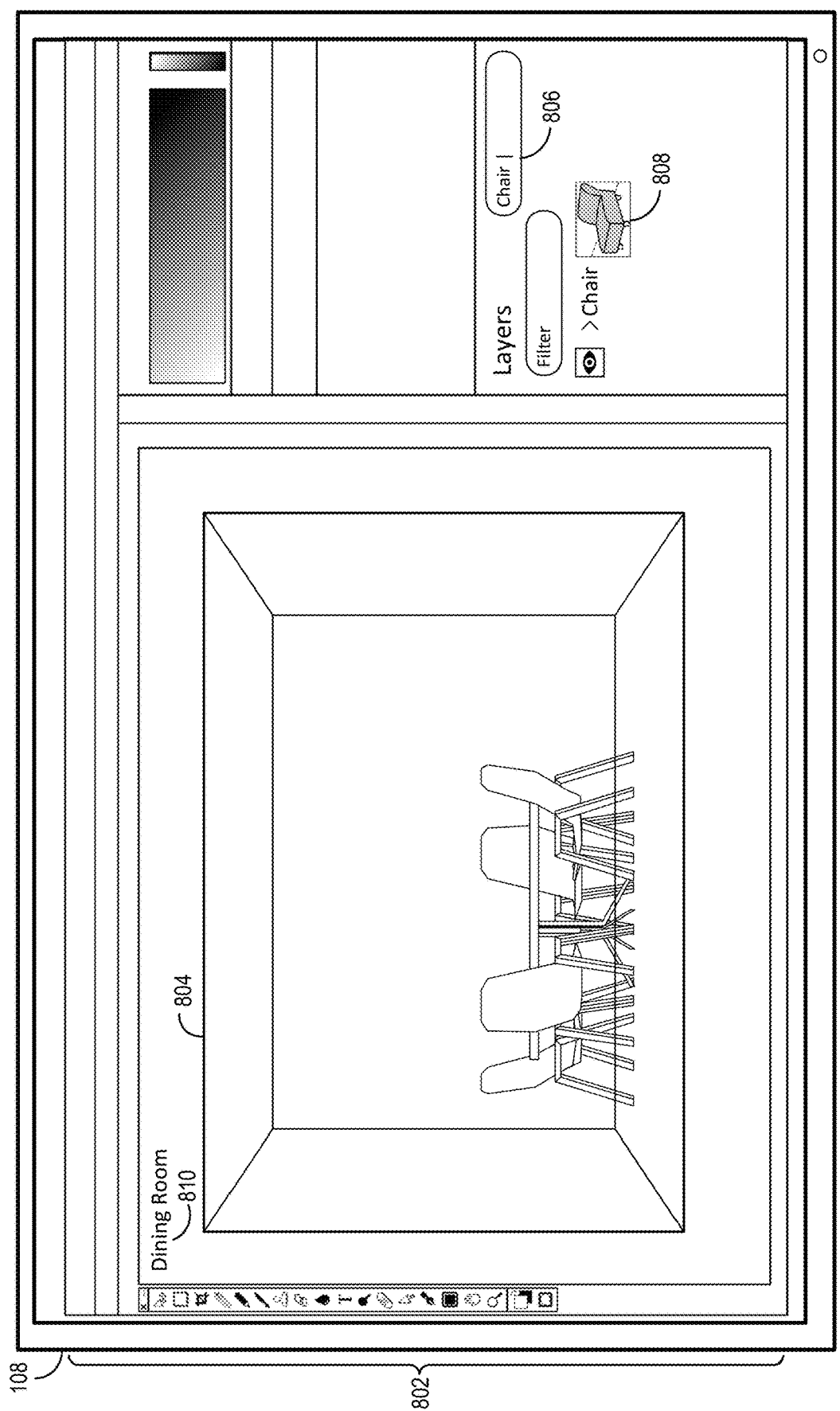
FIG. 8 illustrates an example digital image editing interface for searching image layers across different digital image projects in accordance with one or more embodiments.

As mentioned above, in certain described embodiments, the layer generation system 102 enables searching for image layers across digital image projects. In particular, the layer generation system 102 generates an image layer as part of a first digital image project and further accesses the image layer in response to a search query within a second digital image project (e.g., to incorporate the image layer within the second digital image project). FIG. 8 illustrates an example user interface associated with a digital image project to search for image layers associated with other digital image projects in accordance with one or more embodiments.

As illustrated in FIG. 8, the layer generation system 102 provides a digital image editing interface 802 for display on the client device 108. The digital image editing interface 802 includes a digital image 804 and a search bar 806. As also illustrated in FIG. 8, the layer generation system 102 generates a project name 810 for a digital image project associated with the digital image 804. For example, the layer generation system 102 generates a different project name for the digital image 804 than for the digital image 704 or the digital image 604 (which both depict a living room). Indeed, based on the layer labels of the objects depicted within the digital image 804, the layer generation system 102 generates the project name 810 of "dining room."

In some embodiments, the layer generation system 102 receives an indication of a search query via the search bar 806. In response to the search query, the layer generation system 102 searches for and retrieves image layers with layer labels corresponding to the search query (e.g., "chair"). Indeed, as mentioned, the layer generation system 102 stores image layers from different digital image projects within a database (e.g., the database 112) accessible within other digital image projects. Thus, the layer generation system 102 compares layer labels for stored image layers with the search query to identify image layers that correspond to the search query.

As shown, the layer generation system 102 identifies an image layer with a matching layer label of "chair." In some cases, the layer generation system 102 identifies the matching image layer from a different digital image project (e.g., the "living room" project of FIGS. 6 and 7). The layer generation system 102 thus provides the layer element 808 corresponding to the identified image layer. In certain implementations, the layer generation system 102 identifies additional or alternative image layers corresponding to a search query, such as those with layer labels that include, but do not necessarily exactly match, the search query (e.g., a "large chair" layer or a "lounge chair" layer). In some cases, the layer generation system 102 identifies image layers for a search query based on keyword search techniques such as determining similarities between the search query and a layer label that do not necessarily match (e.g., "stool" and "chair"). As shown, the layer generation system 102 provides, for display within the digital image editing interface 802, layer elements corresponding to image layers identified as a result of a search query.

Figure 9:
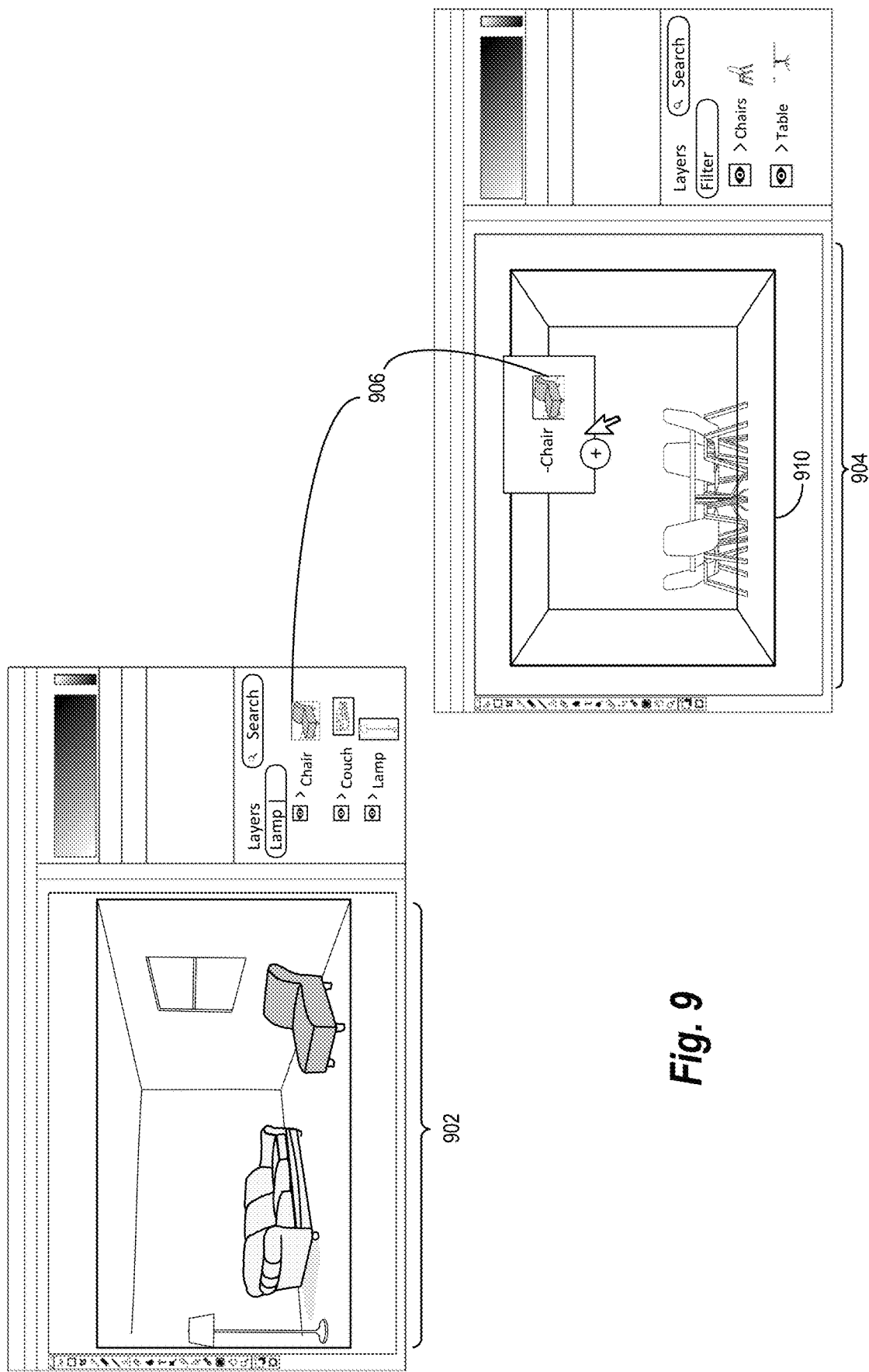
FIG. 9 illustrates an example of moving an image layer between different digital image projects in accordance with one or more embodiments.

As mentioned above, in certain described embodiments, the layer generation system 102 transfers an image layer from one digital image project to another based on user interaction. In particular, the layer generation system 102 receives a click-and-drag interaction from one digital image project interface to select a selectable layer element and to move the selectable layer element to move the selectable layer element to another digital image project interface. FIG. 9 illustrates an example of transferring an image layer from one digital image project to another in accordance with one or more embodiments.

As illustrated in FIG. 9, the layer generation system 102 receives an indication of user interaction to select a layer element from the user interface 902 associated with a first digital image project. The layer generation system 102 receives a further indication of user interaction to move the layer element 906 from the user interface 902 to the user interface 904 associated with a second digital image project. Based on the user input to move the layer element 906 to the user interface 904, the layer generation system 102 adds an image layer to the digital image 910 including a set of pixels depicting an object corresponding to the layer element 906. In addition, the layer generation system 102 updates the layers (and the layer elements within a layers pane) associated with the digital image 910 to reflect the added image layer. As shown, the layer generation system 102 adds a chair layer from the living room image to the dining room image. Moreover, although not illustrated, in one or more embodiments, the layer generation system 102 also adds the pixels corresponding to the chair layer to the dining room image (so that the chair is displayed within the digital image 910).

In some embodiments, the layer generation system 102 transfers image layers between digital image projects via different types of user interfaces. For example, rather than the digital image editing interfaces illustrated in FIG. 9, the layer generation system 102 provides command prompt interfaces associated with the client application 110 (e.g., whereby a user can enter code for digital image editing commands). The layer generation system 102 can further provide selectable layer elements within the command prompt interfaces to click and drag an image layer from one digital image project to another (or from one portion of code within a single digital image project to another).

Figure 10:
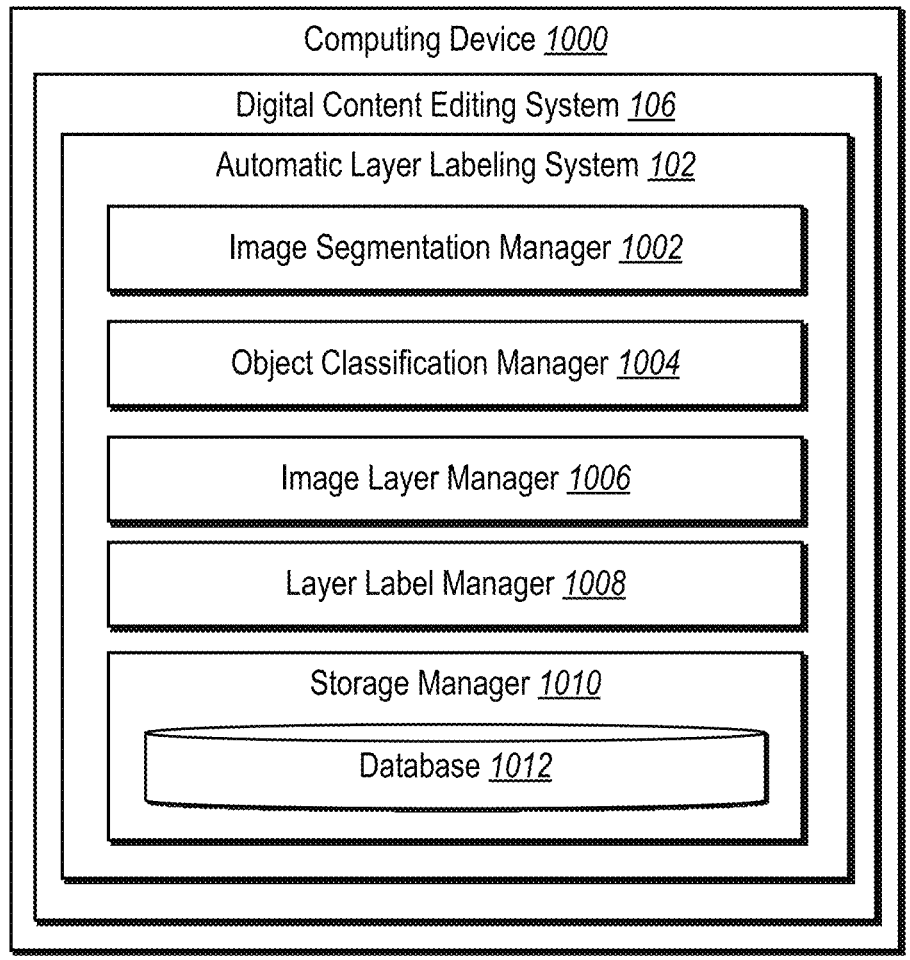
FIG. 10 illustrates a schematic diagram of a layer generation system in accordance with one or more embodiments.

Looking now to FIG. 10, additional detail will be provided regarding components and capabilities of the layer generation system 102. Specifically, FIG. 10 illustrates an example schematic diagram of the layer generation system 102 on an example computing device 1000 (e.g., one or more of the client device 108 and/or the server(s) 104). As shown in FIG. 10, the layer generation system 102 includes an image segmentation manager 1002, an object classification manager 1004, an image layer manager 1006, a layer label manager 1008, and a storage manager 1010.

As just mentioned, the layer generation system 102 includes an image segmentation manager 1002. In particular, the image segmentation manager 1002 manages, maintains, determines, predicts, generates, detects, or identifies sets of pixels depicting individual objects within a digital image. For example, the image segmentation manager 1002 segments a digital image based on pixel values and in accordance with machine learning model techniques utilizing an image segmentation machine learning model. In some cases, the image segmentation manager 1002 detects sets of pixels that depict individual objects within a digital image.

As illustrated in FIG. 10, the layer generation system 102 also includes an object classification manager 1004. In particular, the object classification manager 1004 manages, maintains, determines, generates, classifies, predicts, or identifies object classifications for sets of pixels within a digital image. For example, the object classification manager 1004 classifies sets of pixels by utilizing an object classification machine learning model to analyze sets of pixels detected or segmented by the image segmentation manager 1002.

Additionally, the layer generation system 102 includes an image layer manager 1006. In particular, the image layer manager 1006 manages, maintains, determines, generates, identifies or detects image layers within a digital image. For example, the image layer manager 1006 determines image layers for a digital image based on sets of pixels depicting individual objects. In some cases, the image layer manager 1006 generates object-specific image layers and/or combined image layers to include only specific sets of pixels depicting particular objects, as described herein. In some cases, the image layer manager 1006 also stores image layers for access across digital image projects and enables transfer of an image layer from one digital image project to another (e.g., based on user interaction).

Further, the layer generation system 102 includes a layer label manager 1008. In particular, the layer label manager 1008 manages, maintains, determines, generates, or identifies layer labels for image layers. For example, the layer label manager 1008 determines layer labels based on object classifications. In some cases, the layer label manager 1008 determines layer labels for object-specific layers and/or combined image layers as described herein.

The layer generation system 102 further includes a storage manager 1010. The storage manager 1010 operates in conjunction with, or includes, one or more memory devices such as the database 1012 (e.g., the database 112) that store various data such as an image segmentation machine learning model, an object classification machine learning model, digital images, image layers, and/or layer labels.

In one or more embodiments, each of the components of the layer generation system 102 are in communication with one another using any suitable communication technologies. Additionally, the components of the layer generation system 102 is in communication with one or more other devices including one or more client devices described above. It will be recognized that although the components of the layer generation system 102 are shown to be separate in FIG. 10, any of the subcomponents may be combined into fewer components, such as into a single component, or divided into more components as may serve a particular implementation. Furthermore, although the components of FIG. 10 are described in connection with the layer generation system 102, at least some of the components for performing operations in conjunction with the layer generation system 102 described herein may be implemented on other devices within the environment.

The components of the layer generation system 102 can include software, hardware, or both. For example, the components of the layer generation system 102 can include one or more instructions stored on a computer-readable storage medium and executable by processors of one or more computing devices (e.g., the computing device 1000). When executed by the one or more processors, the computer-executable instructions of the layer generation system 102 can cause the computing device 1000 to perform the methods described herein. Alternatively, the components of the layer generation system 102 can comprise hardware, such as a special purpose processing device to perform a certain function or group of functions. Additionally, or alternatively, the components of the layer generation system 102 can include a combination of computer-executable instructions and hardware.

Furthermore, the components of the layer generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the layer generation system 102 may be implemented as part of a stand-alone application on a personal computing device or a mobile device. Alternatively, or additionally, the components of the layer generation system 102 may be implemented in any application that allows creation and delivery of marketing content to users, including, but not limited to, applications in ADOBE® EXPERIENCE MANAGER and CREATIVE CLOUD®, such as ADOBE PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-10 the corresponding text, and the examples provide a number of different systems, methods, and non-transitory computer readable media for generating and labeling image layers for digital images using a machine learning approach. In addition to the foregoing, embodiments can also be described in terms of flowcharts comprising acts for accomplishing a particular result. For example, FIG. 11 illustrates a flowchart of an example sequence or series of acts in accordance with one or more embodiments.

Figure 11:
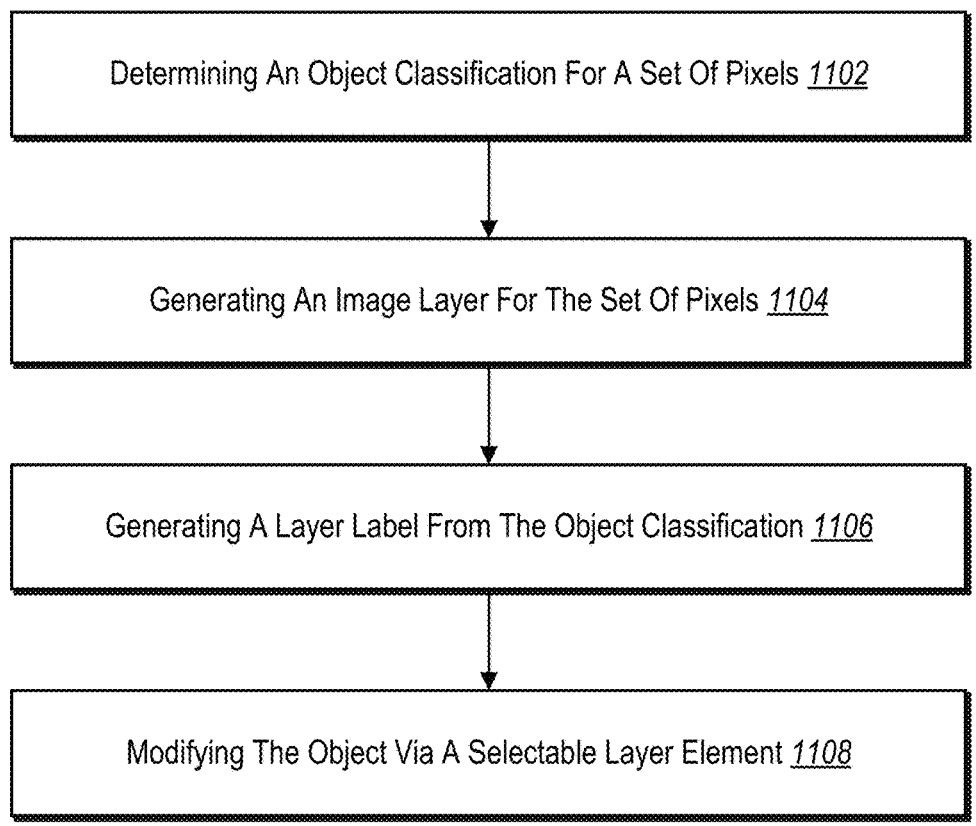
FIG. 11 illustrates a flowchart of a series of acts for generating image layers and determining image layers utilizing a machine learning approach in accordance with one or more embodiments.

While FIG. 11 illustrates acts according to particular embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for generating and labeling image layers for digital images using a machine learning approach. In particular, the series of acts 1100 includes an act 1102 of determining an object classification for a set of pixels. For example, the act 1104 involves determining, utilizing an object classification machine learning model, an object classification for a set of pixels depicting an object within a digital image. In some cases, the series of acts 1100 includes an act of detecting sets of pixels depicting individual objects within the digital image. The act 1104 can involve determining, utilizing the object classification machine learning model, object classifications for the individual objects. Detecting the set of pixels can include utilizing an image segmentation machine learning model to determine pixels within the digital image depicting different objects.

As illustrated, the series of acts 1100 includes an act 1104 of generating an image layer for the set of pixels. In particular, the act 1104 involves generating an image layer associated with the digital image and comprising the set of pixels. For example, the act 1104 involves generating image layers associated with the digital image from the sets of pixels depicting the individual objects.

As further illustrated, the series of acts 1100 includes an act 1106 of generating a layer label from the object classification. In particular, the act 1106 involves generating a layer label for the image layer utilizing the object classification. In some cases, the series of acts 1100 includes an act of generating a digital image name for the digital image from the layer label. For example, the act 1106 involves generating layer labels for the image layers utilizing the object classifications.

Additionally, the series of acts 1100 includes an act 1108 of modifying the object via a selectable layer element. In particular, the act 1108 involves modifying the object within the digital image based on a user interaction with a selectable layer element corresponding to the image layer and comprising the layer label. For example, the act 1108 involves providing, for display via a user interface of a client device, a plurality of selectable layer elements comprising the layer labels and operable to select the sets of pixels depicting the individual objects. In some cases, the series of acts 1100 receiving a user interaction to select a selectable layer element from among the plurality of selectable layer elements and to move the selectable layer element to a different user interface associated with a separate digital image project and, in response to the user interaction, moving the selectable layer element to the different user interface.

In some embodiments, the act 1108 involves providing, for display via a user interface of a client device, a selectable layer element for the labeled image layer and selecting the set of pixels depicting the object within the digital image based on a user interaction with the selectable layer element. In certain cases, the series of acts 1100 includes acts of, in response to selecting the set of pixels depicting the object within the digital image: highlighting the set of pixels depicting the object and providing, for display via the user interface, a layer label indicating the set of pixels and comprising the object classification for the object.

In some embodiments, the series of acts 1100 includes an act of receive an indication of a user interaction to modify the object depicted within the digital image. Further, the series of acts 1100 can include an act of, in response to the indication of the user interaction to modify the object, updating the image layer and the layer label to reflect modifications made to the object via the user interaction to modify the object. In some cases, the series of acts 1100 include acts of receiving an indication of a user interaction to modify an object of the individual objects depicted within the digital image and generating an updated image layer and updated layer label to reflect modification made to the object via the user interaction.

In some cases, the series of acts 1100 includes acts of receiving a search query indicating the layer label and, in response to the search query, providing the selectable layer element corresponding to the image layer for display via a user interface. Further, the series of acts 1100 can include an act of receiving the search query via a user interface corresponding to a separate digital image project for a different digital image and an act of providing the selectable layer element within the user interface corresponding to the separate digital image project for the different digital image. In one or more embodiments, the series of acts 1100 includes an act of modifying a different digital image associated with a separate digital image project to include the image layer based on a second user interaction via a user interface associated with the separate digital image project.

In certain embodiments, the series of acts 1100 includes an act of determining a second object classification for a second set of pixels depicting a second object within the digital image utilizing the object classification machine learning model. In these or other embodiments, the series of acts 1100 includes acts of generating a second image layer associated with the digital image and comprising the second set of pixels and generating a second layer label for the second image layer utilizing the second object classification. The series of acts 1100 can include an act of automatically generating a project name for a digital image project corresponding to the digital image utilizing the layer labels.

In one or more embodiments, the series of acts 1100 includes an act of store the image layers within a database accessible across different digital image projects. In these or other embodiments, the series of acts 1100 includes an act of modifying a different digital image associated with a separate digital image project to include one of the image layers from the database based on a user interaction with a selectable layer element of the plurality of selectable layer elements via the user interface, wherein the user interface is associated with the separate digital image project. In some cases, the series of acts 1100 includes acts of receiving, via the user interface of the client device, a filter query to filter the image layers associated with the digital image and, in response to the filter query, filtering out one or more selectable layer elements from the plurality of selectable layer elements displayed via the user interface.

In certain cases, the series of acts 1100 includes an act of, in response to generating the image layers from the sets of pixels, highlighting the sets of pixels corresponding to the image layers for display via the user interface of the client device. In one or more embodiments, the series of acts 1100 includes an act of determining, from the object classifications, two or more sets of pixels depicting objects of a common object classification and an act of generating a combined image layer associated with the digital image and comprising the two or more sets of pixels depicting the objects of the common object classification.

In one or more implementations, the series of acts 1100 includes an act of receiving indications of a plurality of successive user interactions to modify the objects depicted within the digital image. Further, the series of acts 1100 includes an act of, in response to each user successive interaction of the plurality of successive user interactions, generating updated image layers and updated layer labels to reflect modifications made to the objects via the plurality of successive user interactions. In addition, the series of acts 1100 can include acts of receiving a search query via the user interface indicating the labeled image layer and providing the selectable layer element for display via the user interface in response to the search query.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
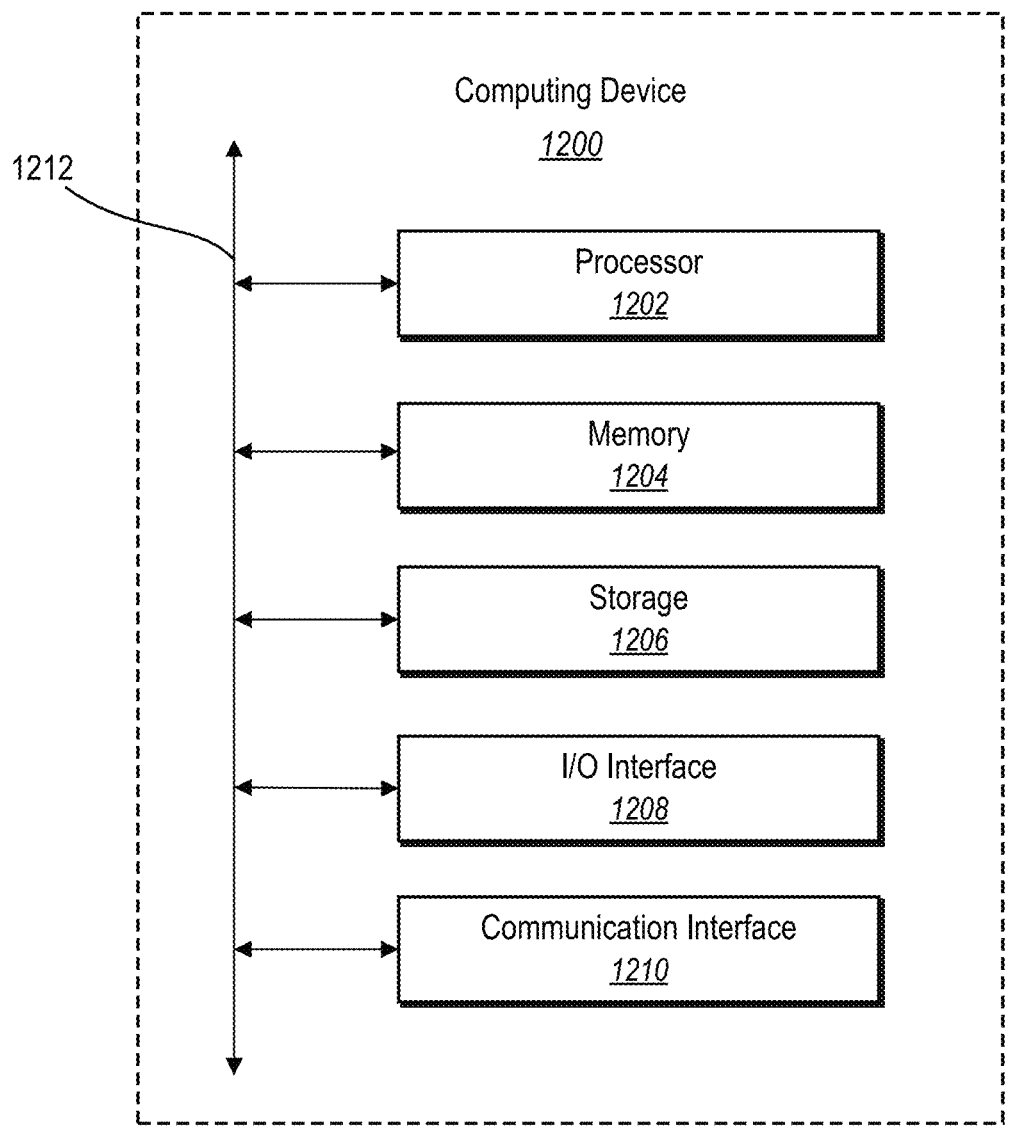
FIG. 12 illustrates a block diagram of an example computing device in accordance with one or more embodiments.

FIG. 12 illustrates, in block diagram form, an example computing device 1200 (e.g., the computing device 1000, the client device 108, and/or the server(s) 104) that may be configured to perform one or more of the processes described above. One will appreciate that the layer generation system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   determine, utilizing an object classification machine learning model, an object classification for a set of pixels depicting an object within a digital image;
   generate an image layer associated with the digital image and comprising the set of pixels;
   generate, for display within a digital image editing interface, a selectable layer element for the image layer corresponding to the object by:
      determining a layer label for the image layer utilizing the object classification; and
      generating, within a layers pane of the digital image editing interface, the selectable layer element as an interactive element reflecting pixels of the image layer and corresponding to the layer label;
   detect one or more edits made to the set of pixels depicting the object in the digital image; and
   update the layer label for the image layer by reapplying the object classification machine learning model in response to the one or more edits made to the set of pixels depicting the object in the digital image.

2. The non-transitory computer readable medium of claim 1, further comprising instructions that, when executed by the at least one processor, cause the computing device to:
   receive an indication of a user interaction to modify the object depicted within the digital image by interacting with the selectable layer element within the layers pane; and
   in response to the indication of the user interaction to modify the object, update the image layer and the layer label to reflect modifications made to the object via the user interaction to modify the object.

3. The non-transitory computer readable medium of claim 1, further comprising instructions that, when executed by the at least one processor, cause the computing device to:
   receive a search query indicating the layer label; and
   in response to the search query, provide the selectable layer element corresponding to the image layer for display via the digital image editing interface.

4. The non-transitory computer readable medium of claim 3, further comprising instructions that, when executed by the at least one processor, cause the computing device to:
   receive the search query via a user interface corresponding to a separate digital image project for a different digital image; and
   provide the selectable layer element for display within the user interface corresponding to the separate digital image project for the different digital image.

5. The non-transitory computer readable medium of claim 1, further comprising instructions that, when executed by the at least one processor, cause the computing device to generate a digital image name for the digital image from the layer label.

6. The non-transitory computer readable medium of claim 1, further comprising instructions that, when executed by the at least one processor, cause the computing device to modify a different digital image associated with a separate digital image project to include the image layer based on a second user interaction via a user interface associated with the separate digital image project.

7. The non-transitory computer readable medium of claim 1, further comprising instructions that, when executed by the at least one processor, cause the computing device to:
   determine a second object classification for a second set of pixels depicting a second object within the digital image utilizing the object classification machine learning model;
   generate a second image layer associated with the digital image and comprising the second set of pixels; and
   generate a second layer label for the second image layer utilizing the second object classification.

8. A system comprising:
   one or more memory devices comprising a digital image and an object classification machine learning model; and
   one or more computing devices that are configured to cause the system to:
      detect sets of pixels depicting individual objects within the digital image;
      determine, utilizing the object classification machine learning model, object classifications for the individual objects;
      generate image layers associated with the digital image from the sets of pixels depicting the individual objects; and
      generate, for display within a digital image editing interface, a plurality of selectable layer elements for the image layers corresponding to the individual objects by:
         determining layer labels for the image layers utilizing the object classifications; and
         generating, within a layers pane of the digital image editing interface, the plurality of selectable layer elements as interactive elements reflecting pixels of corresponding image layers and indicating respective layer labels;
      detect one or more edits made to a set of pixels depicting an object in the digital image; and
      update a layer label for an image layer corresponding to the object by reapplying the object classification machine learning model in response to the one or more edits made to the set of pixels depicting the object in the digital image.

9. The system of claim 8, wherein the one or more computing devices are further configured to cause the system to:
   receive an indication of a user interaction to modify the object within the digital image by interacting with a selectable layer element within the layers pane; and
   generate an updated image layer and updated layer label to reflect modification made to the object via the user interaction.

10. The system of claim 8, wherein the one or more computing devices are further configured to cause the system to automatically generate a project name for a digital image project corresponding to the digital image utilizing the layer labels.

11. The system of claim 8, wherein the one or more computing devices are further configured to cause the system to:
   store the image layers within a database accessible across different digital image projects; and
   modify a different digital image associated with a separate digital image project to include one of the image layers from the database based on a user interaction with a selectable layer element of the plurality of selectable layer elements via the digital image editing interface, wherein the digital image editing interface is associated with the separate digital image project.

12. The system of claim 8, wherein the one or more computing devices are further configured to cause the system to:
receive, via the digital image editing interface, a filter query to filter the image layers associated with the digital image; and
in response to the filter query, filter out one or more selectable layer elements from the plurality of selectable layer elements displayed via the digital image editing interface.

13. The system of claim 8, wherein the one or more computing devices are further configured to cause the system to:
receive a user interaction to select a selectable layer element from among the plurality of selectable layer elements and to move the selectable layer element to a different user interface associated with a separate digital image project; and
in response to the user interaction, move the selectable layer element to the different user interface.

14. The system of claim 8, wherein the one or more computing devices are further configured to cause the system to, in response to generating the image layers from the sets of pixels, highlight the sets of pixels corresponding to the image layers for display via the digital image editing interface.

15. The system of claim 8, wherein the one or more computing devices are further configured to cause the system to:
determine, from the object classifications, two or more sets of pixels depicting objects of a common object classification; and
generate a combined image layer associated with the digital image and comprising the two or more sets of pixels depicting the objects of the common object classification.

16. A computer-implemented method comprising:
detecting a set of pixels depicting an object within a digital image;
determining, utilizing an object classification machine learning model, an object classification for the set of pixels depicting the object within the digital image;
generating an image layer associated with the digital image and comprising the set of pixels;
generating, for display within a digital image editing interface, a selectable layer element for a labeled image layer corresponding to the object by:
determining a layer label for the image layer utilizing the object classification; and
generating, within a layers pane of the digital image editing interface, the selectable layer element as an interactive element reflecting pixels of the image layer and corresponding to the layer label;
providing, for display via a user interface of a client device, a selectable layer element for the labeled image layer;
selecting the set of pixels depicting the object within the digital image based on a user interaction with the selectable layer element;
detecting one or more edits made to the set of pixels depicting the object in the digital image; and
updating the layer label for the image layer by reapplying the object classification machine learning model in response to the one or more edits made to the set of pixels depicting the object in the digital image.

17. The computer-implemented method of claim 16, further comprising:
receiving indications of a plurality of successive user interactions to modify the object depicted within the digital image; and
in response to each user successive interaction of the plurality of successive user interactions, generating updated image layers and updated layer labels to reflect modifications made to the object via the plurality of successive user interactions.

18. The computer-implemented method of claim 16, wherein detecting the set of pixels depicting the object within the digital image comprises utilizing an image segmentation machine learning model to determine pixels within the digital image depicting different objects.

19. The computer-implemented method of claim 16, further comprising:
receiving a search query via the user interface indicating the labeled image layer; and providing the selectable layer element for display via the user interface in response to the search query.

20. The computer-implemented method of claim 16, further comprising, in response to selecting the set of pixels depicting the object within the digital image:
highlighting the set of pixels depicting the object; and
providing, for display via the user interface, a layer label indicating the set of pixels and comprising the object classification for the object.

* * * * *